US011712836B2

(12) United States Patent
Smith et al.

(10) Patent No.: US 11,712,836 B2
(45) Date of Patent: Aug. 1, 2023

(54) AUTOMATED WRAPPING SYSTEM

(71) Applicant: Ascent Auto Interior, LLC, Auburn Hills, MI (US)

(72) Inventors: Ronald Brian Smith, Oxford, MI (US); James Edmond Hajdo, Lapeer, MI (US); Conner Luke Booth, Oxford, MI (US); Steven Scott Fileccia, Waterford, MI (US)

(73) Assignee: Ascent Auto Interior, LLC, Auburn Hills, MI (US)

( * ) Notice: Subject to any disclaimer, the term of this patent is extended or adjusted under 35 U.S.C. 154(b) by 292 days.

(21) Appl. No.: 16/753,383

(22) PCT Filed: Oct. 9, 2018

(86) PCT No.: PCT/US2018/055063
§ 371 (c)(1),
(2) Date: Apr. 3, 2020

(87) PCT Pub. No.: WO2019/074957
PCT Pub. Date: Apr. 18, 2019

(65) Prior Publication Data
US 2020/0282634 A1   Sep. 10, 2020

Related U.S. Application Data

(60) Provisional application No. 62/683,127, filed on Jun. 11, 2018, provisional application No. 62/569,663, filed on Oct. 9, 2017.

(51) Int. Cl.
*B29C 63/04* (2006.01)
*B29C 51/10* (2006.01)
(Continued)

(52) U.S. Cl.
CPC ............ *B29C 63/046* (2013.01); *B29C 51/10* (2013.01); *B29C 51/12* (2013.01); *B29C 63/0073* (2013.01); *B29L 2031/3041* (2013.01)

(58) Field of Classification Search
CPC ....................... B29C 63/046; B29L 2031/3041
See application file for complete search history.

(56) References Cited

U.S. PATENT DOCUMENTS 2,867,158 A    1/1959  Andresen, Jr. et al.
3,888,613 A    6/1975  Fries et al.
(Continued)

FOREIGN PATENT DOCUMENTS

DE    1177918 B      9/1964
DE    17 10 676 A1   2/1973
(Continued)

OTHER PUBLICATIONS

English language abstract for JPH 08-033783 A extracted from espacenet.com database on Sep. 19, 2022, 1 page.
(Continued)

Primary Examiner — Alison L Hindenlang
Assistant Examiner — Debjani Roy
(74) Attorney, Agent, or Firm — Howard & Howard Attorneys PLLC

(57) ABSTRACT

An automated wrapping system for wrapping a substrate with a material includes a support and a nest mounted to the support that is configured to position the material between an outer portion of the substrate and the nest. The automated wrapping system also includes a material folding assembly positioned adjacent to the nest configured for movement between a rest position and an actuated position, wherein the movement of the material folding system to the actuated position engages and folds the free end portion of the material over the edge of the substrate and onto a part of the
(Continued)

inner portion of the substrate while retaining the material against the edge of the substrate. An actuator connected to the material folding assembly moves the material folding assembly between the rest position and the actuated position.

18 Claims, 20 Drawing Sheets

(51) Int. Cl.
*B29C 51/12* (2006.01)
*B29C 63/00* (2006.01)
*B29L 31/30* (2006.01)

(56) References Cited

U.S. PATENT DOCUMENTS

| | | | |
|---|---|---|---|
| 4,231,210 A | 11/1980 | Nagode | |
| 4,704,183 A | 11/1987 | Sigerist | |
| 4,956,961 A | 9/1990 | Janhonen | |
| 5,603,150 A * | 2/1997 | Assink | B68G 7/05 29/91.1 |
| 5,718,791 A | 2/1998 | Spengler | |
| 5,935,364 A | 8/1999 | Groendal et al. | |
| 5,980,676 A | 11/1999 | Meetze | |
| 6,156,398 A | 12/2000 | Weder et al. | |
| 6,167,603 B1 | 1/2001 | Zeiler et al. | |
| 7,574,788 B1 | 8/2009 | Chamlee et al. | |
| 7,789,986 B2 | 9/2010 | Brown et al. | |
| 8,562,779 B2 | 10/2013 | Schilles | |
| 9,302,458 B2 | 4/2016 | Huelke et al. | |
| 10,005,224 B2 | 6/2018 | Huelke et al. | |
| 2003/0178988 A1 * | 9/2003 | Kim | G01R 31/2887 324/750.19 |
| 2003/0232160 A1 | 12/2003 | Spengler | |
| 2005/0229541 A1 | 10/2005 | Griggs et al. | |
| 2007/0042157 A1 | 2/2007 | Dooley et al. | |
| 2007/0214625 A1 * | 9/2007 | Brown | B68G 7/05 29/91.1 |
| 2009/0241474 A1 | 10/2009 | Actis | |
| 2010/0312102 A1 * | 12/2010 | Barnes | A61B 34/20 600/424 |
| 2015/0096668 A1 | 4/2015 | Anders et al. | |
| 2015/0246743 A1 | 9/2015 | Beck | |
| 2018/0201004 A1 | 7/2018 | Schilles et al. | |

FOREIGN PATENT DOCUMENTS

| | | |
|---|---|---|
| DE | 1710676 A1 | 2/1973 |
| DE | 3009422 A1 | 9/1981 |
| FR | 2 240 107 A1 | 3/1975 |
| FR | 2240107 A1 | 3/1975 |
| GB | 1465471 A | 2/1977 |
| JP | H08033783 A | 2/1996 |
| JP | 3020233 B2 | 3/2000 |
| JP | 3177926 U | 8/2012 |
| JP | 2015057310 A | 3/2015 |
| JP | 6362982 B2 | 7/2018 |

OTHER PUBLICATIONS

English language abstract for JP 2015-057310 A extracted from espacenet.com database on Sep. 29, 2021, 2 pages.
Supplementary European Search Report for Application No. EP 18 86 6858 dated Sep. 15, 2021, 4 pages.
International Search Report for Application No. PCT/US2018/055063 dated Jan. 8, 2019, 1 page.
Direct Industry, "Pneumatic Press Webpage", 2017, https://www.directindustry.com/industrial-manufacturer/oneumatic-press-65040.html, 14 pages.
Omnimax, "Machine Fabric Panel Stretch and Assembly Webpage", 2017, https://www.omnimaxparts.com/cubicle-fabric-stretching-machine-p/fabricstretchmachine.htm, 14 pages.
Youtube, "Fabric Stretch Machine Video", Oct. 12, 2011, https://www.youtube.com/watch?v=AivkkAyzWB0, 2 pages.
Youtube, "MHP Stretching Canvas Production Video (English)", Jul. 10, 2013, https://www.youtube.com/watch?v=cHuukEzmxRs, 2 pages.
Computer-generated English language translation for DE 1177918 B extracted from espacenet.com database on May 28, 2020, 8 pages.
English language abstract for DE 3009422 A1 extracted from espacenet.com database on May 28, 2020, 1 page.
English language abstract for JP 3020233 B2 extracted from espacenet.com database on May 28, 2020, 1 page.
Computer-generated English language translation for JP3177926 U extracted from espacenet.com database on May 28, 2020, 9 pages.
English language abstract for JP 6362982 B2 extracted from espacenet.com database on May 28, 2020, 1 page.
Computer-generated English translation for DE 17 10 676 A1 extracted from the espacenet.com database on Jun. 23, 2021, 8 pages.
English language abstract not found for FR 2 240 107 A1; however, see English language equivalent U.S. Pat. No. 3,888,613. Original document extracted from espacenet.com database on Jun. 23, 2021, 40 pages.
Supplementary Partial European Search Report for Application No. EP 10 86 6858 dated May 20, 2021, 2 pages.

* cited by examiner

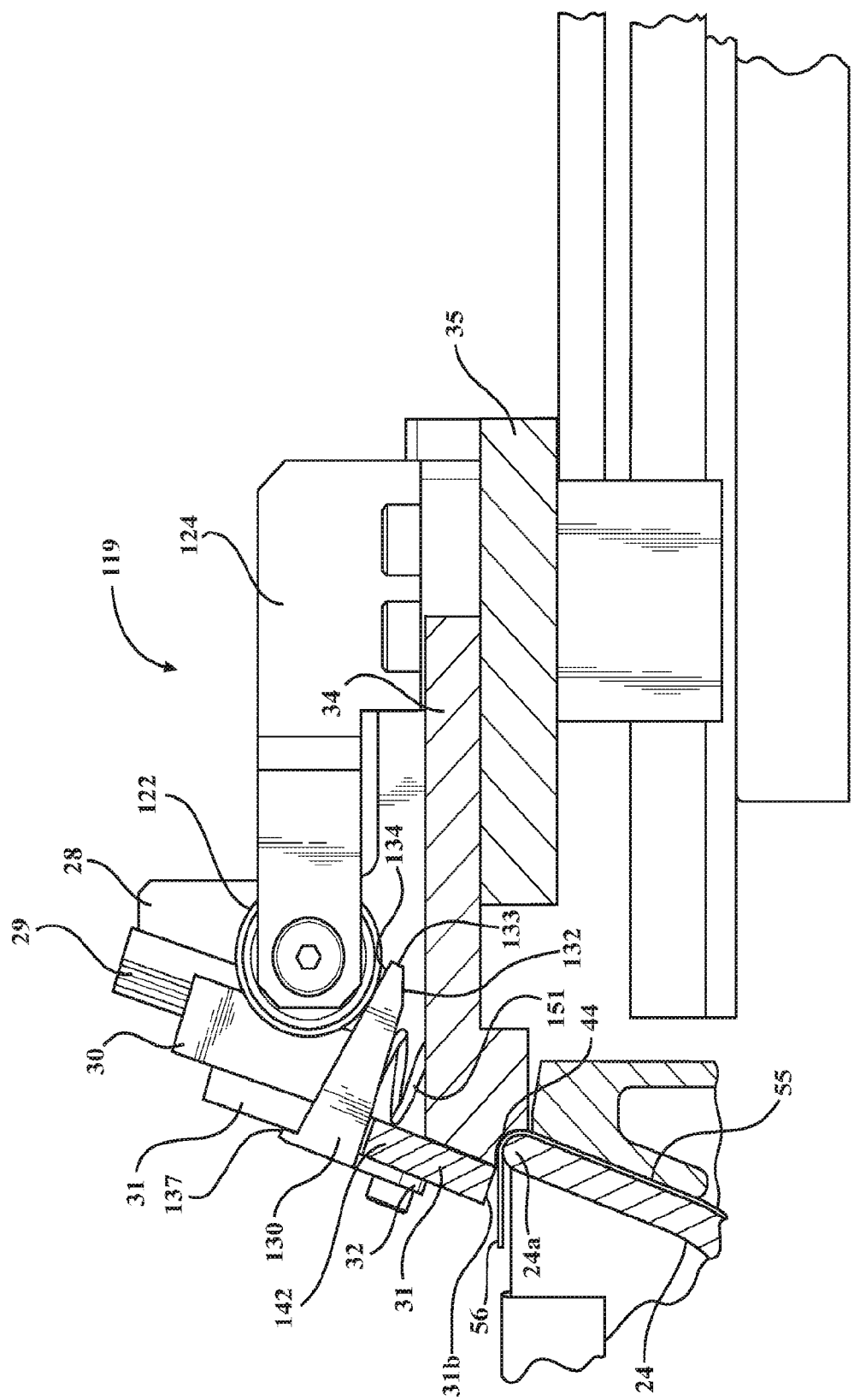

AUTOMATED WRAPPING SYSTEM

CROSS-REFERENCE TO RELATED APPLICATIONS

This application is the National Stage of International Patent Application No. PCT/US2018/055063, filed on Oct. 9, 2018, which claims the benefit of U.S. Provisional Patent Application No. 62/683,127, filed on Jun. 11, 2018 and U.S. Provisional Patent Application No. 62/569,663, filed on Oct. 9, 2017, the contents of which are incorporated herein by reference.

BACKGROUND OF THE INVENTION

1. Field of the Invention

The invention generally relates to wrapping systems for wrapping materials onto a substrate, and more particularly to automated wrapping systems for wrapping materials onto a substrate.

2. Description of Related Art

Currently parts in various industries such as automotive, heavy truck, aerospace, motorcycle, furniture, and so forth have vinyl, leather, cloth, polyolefin or other fabric like materials wrapped over them to cover up the part structure underneath. This wrapping thus provides a number of benefits by making the part softer to the touch, reducing the chance of exposure to sharp edges, covering subtle flaws and inconsistencies within/on the substrate, as well as increasing the aesthetic appearance of the product. This upturn of safety, comfort, and visual appearance magnifies the product's value, quality, and overall influence on the customer's satisfaction. For instance, an automobile typically provides a center console lid with leather or vinyl wrapping over the plastic part substrate structure, this is where a human's arm rests when driving. Additional vehicular parts and products that use an equivalent or similar wrapping would include pillar covers, instrument panels, seats, steering wheels, door panels, floor mats, and so on.

The wrapped material is commonly attached/fastened to these part substrate structures with staples or glue or hog-rings etc. A center console lid, for example, is stapled in the areas accessible for a staple gun to properly install the staple. In this instance staples are paramount for securing the vinyl or leather to the substrate structure.

For thousands of years humans have wrapped leather/vinyl like material (i.e. animal hide) and it is understandable why this had to be done by hand in the past. However, despite modern technology and advancements in manufacturing processes, this wrapping and fastening process is still done by hand. This procedure is a very labor intensive and expensive. Moreover, it is a time-consuming process that also tends to lack consistency due to the following negative issues associated with manual hand wrapping and fastening.

The subject invention provides an automated wrapping system to address these issues.

SUMMARY OF THE INVENTION AND ADVANTAGES

The subject invention relates to an automated wrapping system for wrapping/trimming a substrate with a material, with the substrate having an outer portion and an inner portion and an edge connecting the inner portion to the outer portion. The automated wrapping system comprises a support and a nest mounted to the support, with the nest configured to position the material between the outer portion of the substrate and the nest. The material includes a free end portion not positioned between the nest and the outer portion of the substrate. The automated wrapping system also comprises a material folding assembly positioned adjacent to the nest and includes a sub-assembly configured for movement between a rest position and an actuated position. The automated wrapping system also comprises an actuator connected to the sub-assembly and configured to move the sub-assembly to the actuated position for engaging and folding the free end portion of the material over the edge of the substrate and onto a part of the inner portion of the substrate.

The subject invention provides the industry, as well as individuals, throughout the world a safer, more accurate, simpler, worker health conscious, efficient, faster, more economic and financially advantageous method to wrap, align, stretch and fasten material over substrates (i.e., part structures).

BRIEF DESCRIPTION OF THE DRAWINGS

Advantages of the present invention will be readily appreciated as the same becomes better understood by reference to the following detailed description when considered in connection with the accompanying drawings.

FIG. 2A is a close-up view of a portion of FIG. 2 in circle 2A.

FIG. 12A is a perspective view of an automated wrapping system with the material folding assembly of FIG. 11 having the sub-assembly in an actuated position and the biasing slide in the non-operational position.

DETAILED DESCRIPTION

Figure 1:
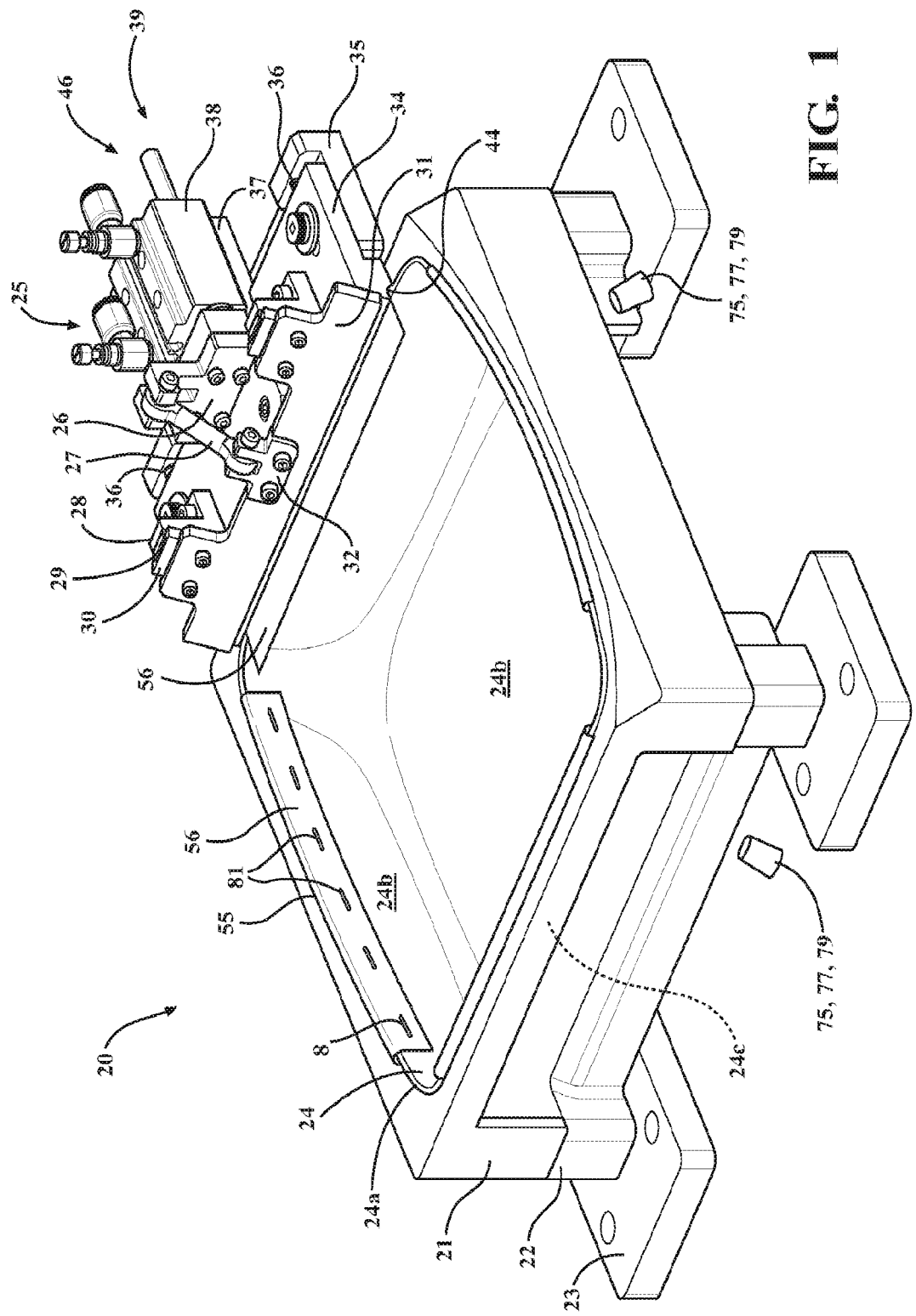
FIG. 1 is a perspective view of an automated wrapping system in accordance with one embodiment with a material folding assembly having a sub-assembly in a rest position.
Figure 2:
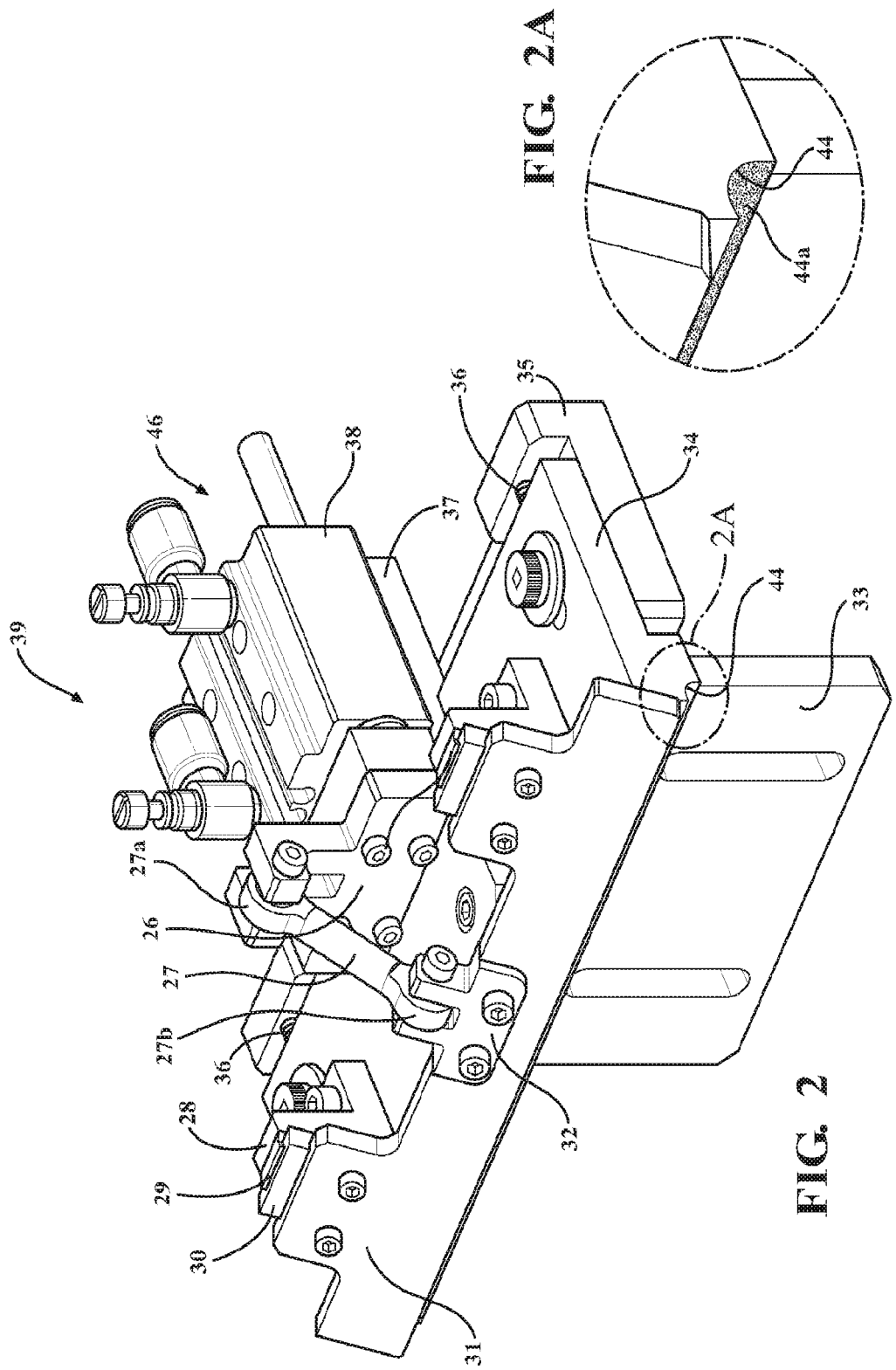
FIG. 2 is a perspective view of the material folding assembly of FIG. 1 having the sub-assembly in the rest position.
Figure 3:
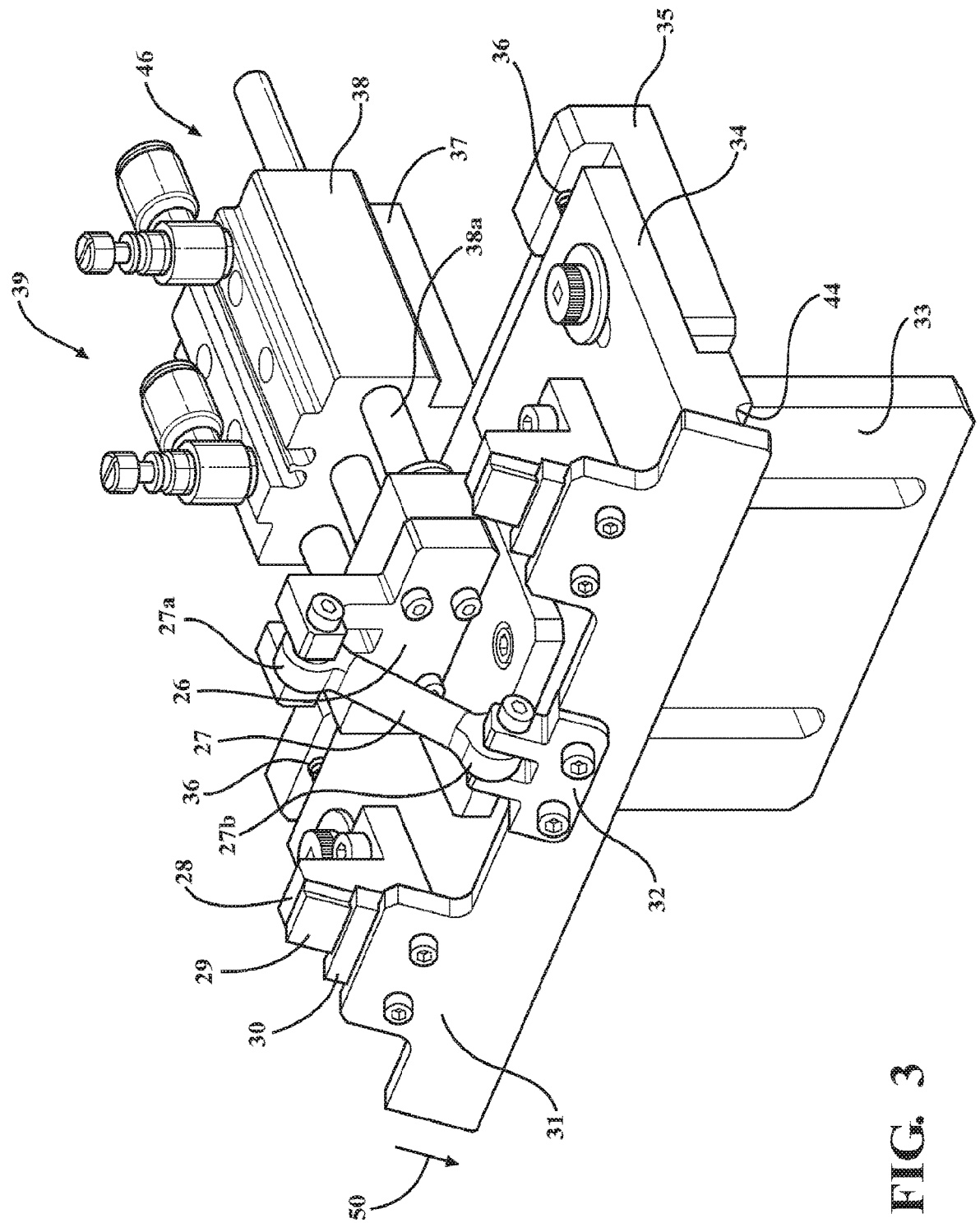
FIG. 3 is a perspective view of the material folding assembly of FIG. 1 having the sub-assembly in an actuated position.
Figure 4:
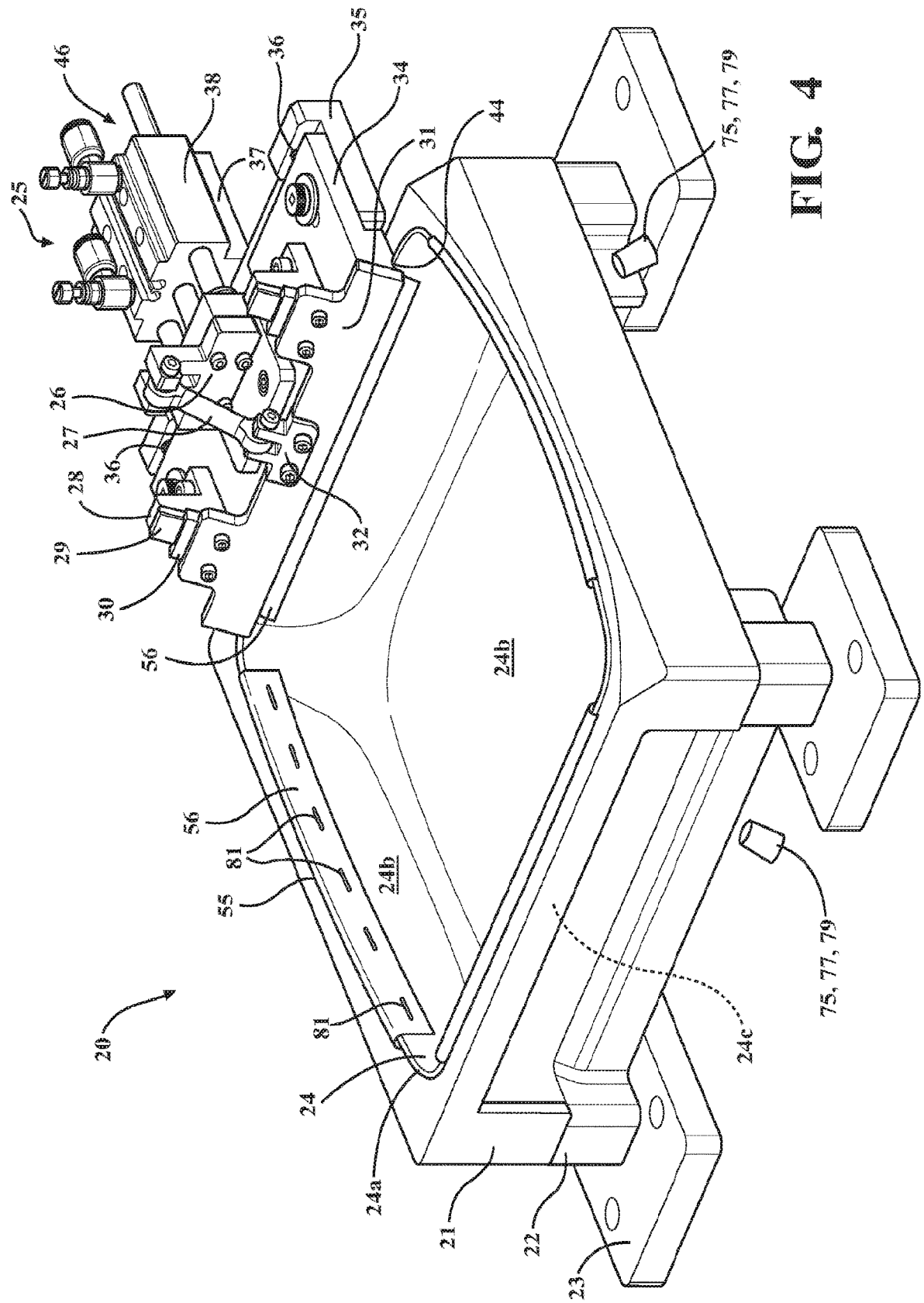
FIG. 4 is a perspective view of FIG. 1 with the sub-assembly in the actuated position.

With reference to the Figures, wherein like numerals indicate like parts throughout the several views, various embodiments of an automated wrapping system are shown in the attached Figures and description. As is clear from the Figures and description, the subject automated wrapping system virtually eliminates waste that is found from the trimming processes of the prior art.

The automated wrapping system 20 of each of the representative embodiments utilizes a substrate nest, or nest, 21 mounted on a support 22, which is in turn supported by footings 23. It is to be appreciated that the support 22 and footings 23 can be of any suitable design or configuration, and the nest 21 will be configured with a particular contour/features to match a component 24 to be trimmed.

The component, otherwise referred to as a part structure or substrate 24, is to be wrapped (i.e., trimmed) with a material 55, and the resultant trimmed substrate forms a desired part 100. As used hereinafter, the terms "trimmed" and "wrapped" may be used interchangeably. Exemplary parts 100 that can be formed in accordance with the subject invention include, but are not limited, to vehicular parts such as center console lids, pillar covers, instrument panels, seats, steering wheels, door panels, floor mats, and so on. The substrate 24 and material 55 may be of any suitable type, design or configuration as known in the industry. For example, the substrate 24 may be a plastic, and the material 55 may be a leather or faux leather trim.

In addition, the automated wrapping system 20 of each of the representative embodiments utilizes a material folding assembly, shown at 25, to couple the material 55 to the substrate 24, and in particular to wrap the free end portion 56 of the material 55 onto an edge 24a and inner portion 24b of the substrate 24. The material folding assembly 25 includes a sub-assembly, as described in the various embodiments, below that moves between a rest position and an actuated position (alternatively the material folding assembly 25 is described in certain instances of moving between the rest positon and actuated positon). When in the actuated position, as will be described in various embodiments below, the material folding assembly 25 engages and folds the free end portion 56 of the material 55 over the edge 24a of the substrate 24 and onto a part of the inner portion 24b of the substrate 24 while retaining the material against the edge 24a of the substrate 24. In certain embodiments, the material folding assembly 25 retains the material against the edge of the substrate prior to the material folding system and sub-assembly being moved to the actuated position. The sub-assembly includes a number of operative components as described below, but can include more or less components without deviating from the overall scope of the invention.

As described herein, the material folding assembly 25, including the moveable sub-assembly, can be configured in a variety of ways and function to trim, or wrap, or otherwise cover the substrate 24 with material 55.

In one embodiment, as shown in FIGS. 1-7, the material folding assembly 25 is mounted on an assembly flange 33, which is positioned adjacent to the nest 21. In certain embodiments, the assembly flange 33 can be coupled to the support 22, or mounted to the support 22, or integrally formed with the support 22. In this embodiment, the moveable sub-assembly is referred to by reference numeral 39.

The material folding assembly 25 in this embodiment includes an end block 26 with an actuation rod 27 pivotally connected thereto. There is a fixed mount 28 bolted to a biasing slide 34. A moveable mount 29 is mounted to the fixed mount 28 with a slide folder 30 moving along the moveable mount 29 during operation.

A material folder 31, having a bottom edge 31b, is mounted to the slide folder 30. A connector 32 is mounted to the material folder 31 with the actuation rod 27 interconnecting the connector 32 (and material folder 31) and the end block 26. It should be appreciated that the specifics of the sliding structure of the sub-assembly 39 can be modified without deviating from the overall scope of the invention so long as the material folder is able to move from a rest position to an actuated position.

Figure 5:
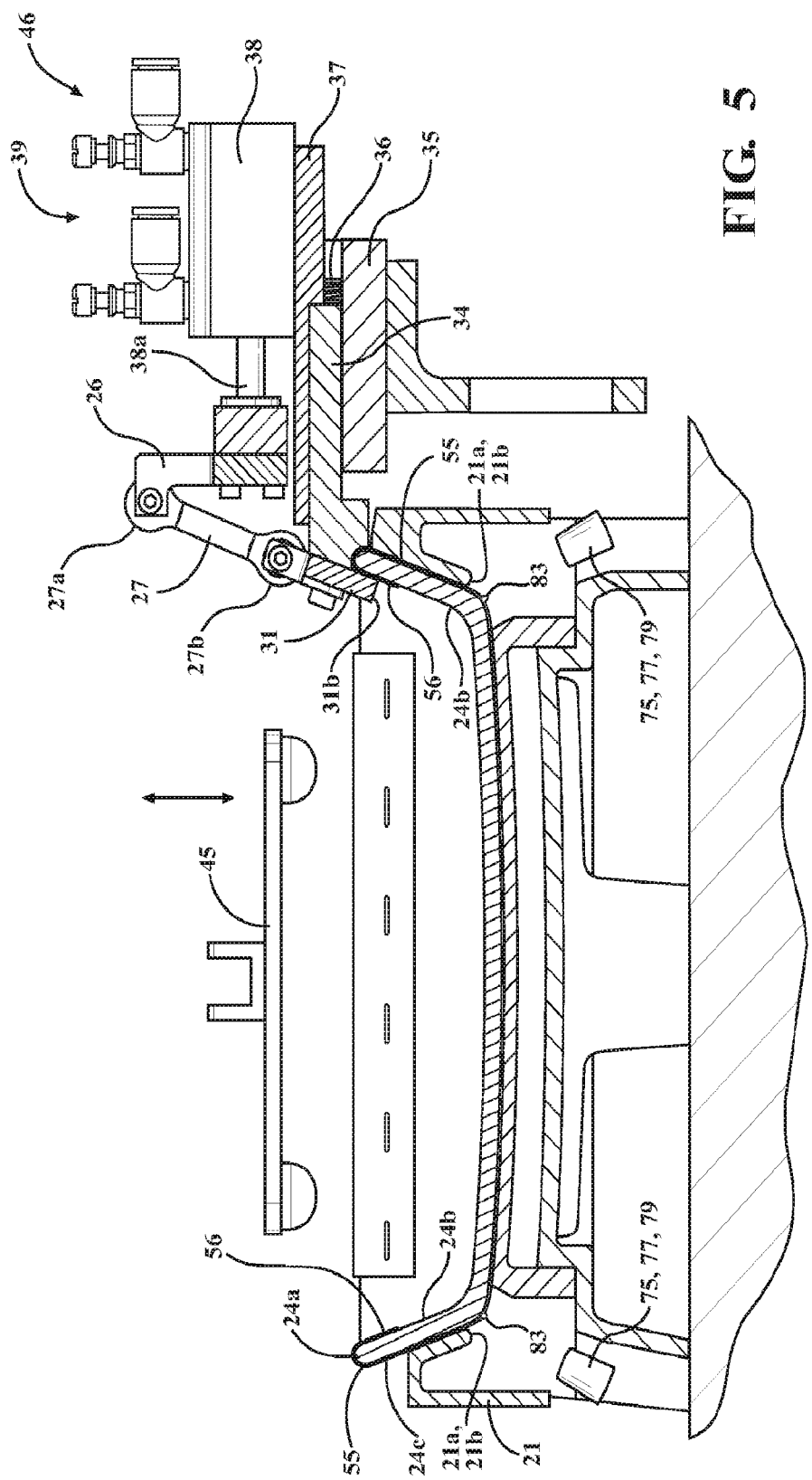
FIG. 5 is a fragmented partially cross-sectional side view of the automated wrapping system of FIG. 1 with the sub-assembly in the actuated position and a platen in a raised position.
Figure 6:
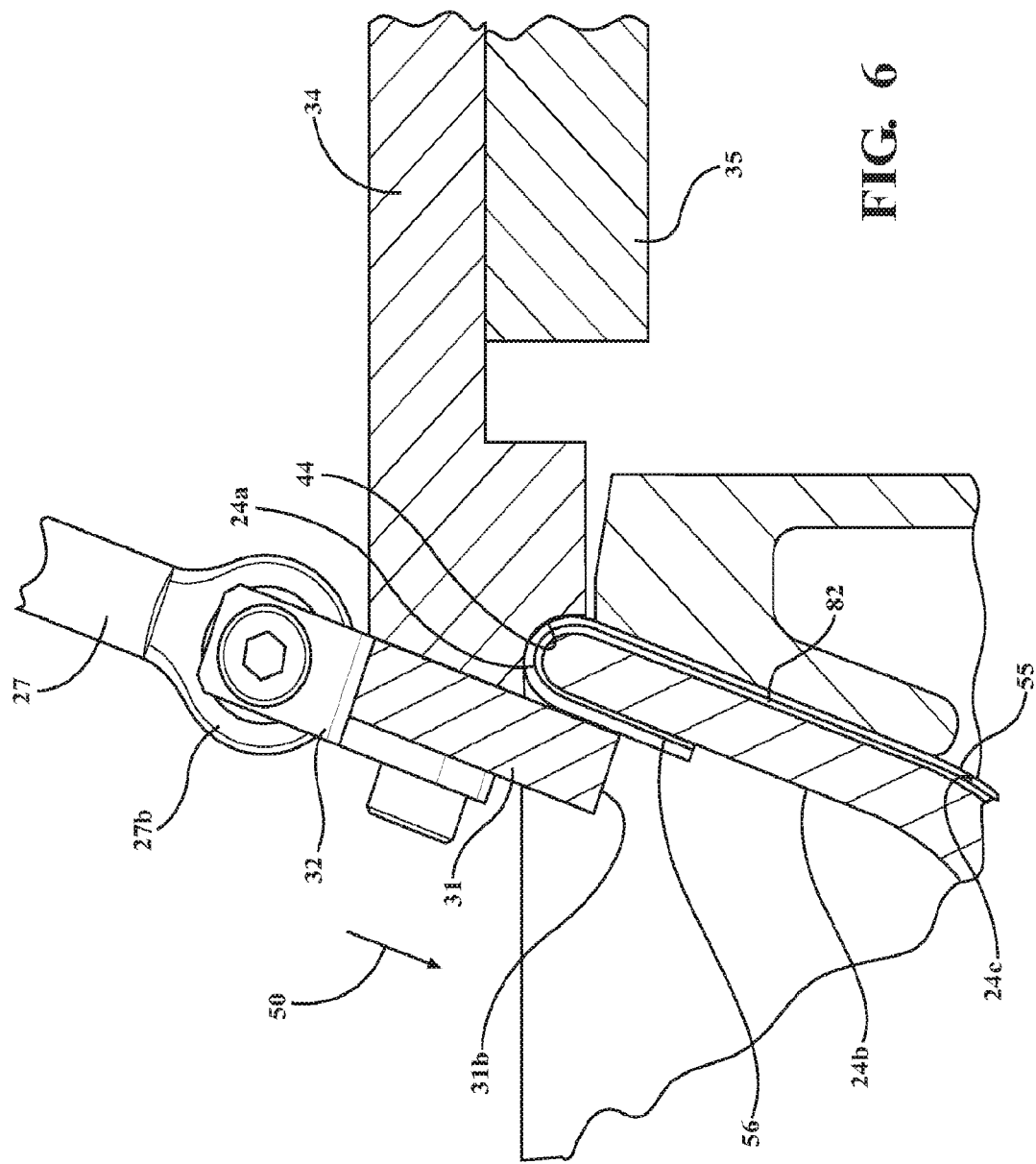
FIG. 6 is a close-up view of a portion of FIG. 5.

The biasing slide 34 is moveably mounted to a slide mount 35 and carries the material folder 31 is coupled to an actuator. A slide spring 36 provides a continuous biasing force to the biasing slide 34. As best shown in FIG. 5, the biasing slide 34 includes a retainer section 44. When in operation, as shown in FIG. 1 (when the material folding assembly 25 is in the rest position) and FIG. 5 (when the material folding assembly 25 is in the actuated position), the biasing slide 34 is moved to a biasing position such that that retainer section 44 engages the free end portion 56 of the material 55 extending outwardly from the nest 21 to hold this free end portion 56 of the material 55 in position against an edge 24a of the substrate 24. Typically, the movement of the biasing slide 34 is via an actuator (such as through actuator 46), but also can be accomplished by moving the material folding assembly 25 in a wide variety of other ways. The retainer section 44 includes a contoured engagement surface 44a (see FIG. 2A) that directly engages the material 55 at the edge of the substrate 24. The engagement surface can be in form of a groove, such as a continuous groove, or any other suitable configuration to grip against the material 55.

The material folder 31 engages a free end portion 56 of the material 55 to fold the material 55 inward against a part of an inner portion 24b of the substrate 24 when the material folding assembly 25 and sub-assembly 39 are in the actuated position, and holds this free end portion 56 of the material 55 in position against the interior portion 24b of the substrate 24. An interior surface of the material folder 31 could be scored or have some other rough surface to grip and pull or tension the free end 56 of the material 55. The material 55 may then be secured to the interior portion 24b of the substrate 24, such as by stapling or any other suitable means. The continuous biasing by the slide spring 36 when the biasing slide is in the operational, or biasing positon, automatically maintains the requisite pressure of the retainer section 44 against the material 55 at the edge 24a of the substrate 24.

In certain embodiments, the nest 21 may include a plurality of holes 21a, 21b to permit passage of a vacuum to hold the material 55 in position against a bottom of the nest 21. The upper walls of the nest 21 are smaller than the perimeter walls of the substrate 24 to allow the edges 24a of the substrate 24 to project outward from the nest 21, which allows proper operation of the system as described above.

An actuator 46 provide the actuation of the material folder 31 through the actuation rod 27 and connector 32. In particular, the actuator 46 in the embodiment of FIGS. 1-7 includes an air cylinder mount 37 that supports an air cylinder 38. The air cylinder 38 includes a moveable cylinder rod 38a. The air cylinder 38 is connected to the end block 26 to provide the actuation of the material folder 31 through the actuation rod 27 and connector 32. In particular, the cylinder rod 38a of the actuated actuator 46 is extended outwardly in a direction towards the nest 21 and applies force on the end block 26 to move the end block 26 longitudinally towards the material folder 31 from a first slid position (see FIGS. 1-3) to a second slid position (see FIGS. 4-5), with the first slid position corresponding to the rest position of the sub-assembly 39 and material folding assembly 25 and the second slid position corresponding to the actuated position of the sub-assembly 39 and material folding assembly 25. The movement of the end block 26 towards the material folder 31 causes the upper end 27a of the actuation rod 27 to rotate about the upper pivoting point, corresponding to the pivotal coupling of the upper end 27a of the actuation rod 27 to the end block 26. The lower end 27b of the actuation rod 27, which is separately pivotally coupled to the connector 32, applies a downward force on the connector 32 and material folder 31 to move the sub-assembly 39 and material folding assembly 25 (and in particular the material folder 31) to the actuated position (the movement is illustrated by the arrow 50 in FIG. 3), in which the end 31b of the material folder 31 contacts the material 55 and folds the end of the material 55 over the substrate 24 (see FIG. 5). During this movement, the slide folder 30 slides downward along the moveable mount 29 and aids in the stability of the movement of the material folder 31 to the engaged state.

It is to be appreciated, that any suitable automation technique or sub-system could be employed without deviation from the scope of the invention. For example, the actuator 46 in this embodiment is in the form of a hand actuating device 40 utilizing a handle 41 coupled to a linkage 42 (see the alternative embodiment in FIGS. 11-13), which may replace the air cylinder mount 37 and air cylinder 38 for use as the actuator 46, in which a user simply pivots or otherwise moves the handle 41, thereby moving the linkage 42 longitudinally to contact the end block 26 in the manner described above.

Referring now to FIG. 5, a platen or pressure plate 45 may also be provided as a part of the automated wrapping system 20 to apply pressure against the interior portion 24b of the substrate 24. As known to those skilled in the art, a thin layer of foam 82 (see FIGS. 6 and 7) is typically disposed between the trim/material 55 and the substrate 24. The platen 45 applies uniform pressure to the substrate 24 to compress the foam 82 between the trim/material 55 and the outer portion 24c of the substrate 24. This in turn allows the material 55 to "stretch" or extend about the periphery of the outer portion 24c of the substrate 24. The pressure by the platen 45 is preferably applied prior to the material folding assembly 25 engaging the free end portion 56 of the material 55 when the sub-assembly is moved to the actuated position. Meaning, the free end portions 56 of the trim/material 55 are free when the pressure is applied. After the pressure is applied, and while maintaining the pressure, the material folding assembly 25 comes into position to pull, stretch, or otherwise tension the free end portion 56 of the trim/material 55 and foam layer 82 and fold the material 55 about the edge 24a and inner portion 24b of the substrate 24. As mentioned above, this is accomplished by the retainer section 44 and the material folder 31. Once the free end portions 56 of the trim/material 55 are held in position against the inner portion 24b of the substrate 24 by the material folding assembly 25 as will be described in further detail below, the platen 45 is raised and the pressure is released, which then causes the foam to automatically tension the material 55 about the substrate 24, and in particular against the outer portion 24c of the substrate 24. As appreciated, the platen 45 operates in concert with the biasing slide 34 and the material folder 31 in this embodiment to properly position and tension the material 55 about the substrate 24. Now that the platen 45 has been removed, there is sufficient room to allow a fastening mechanism to affix the free end portions 56 of the material 55 to the inner portion 24b of the substrate 24.

Openings 21b (see FIG. 1) may also be provided in the nest 21 to permit access by an alignment system 75. In particular, the openings 21b allow an alignment system 75, here a vision system 77 such as a laser system and/or a camera system 79 (such as a visible light camera system), to view the stitches along the trim/material 55 to ensure that the material 55 is properly aligned on the substrate 24. If there is a misalignment, the pressure by the platen 45 and/or suction by the vacuum can be reduced to allow adjustment of the material 55 relative to the substrate 24. The openings 21b may be the same as openings 21a in certain embodiments (and are labelled accordingly in the FIGS. Provided herein), or different from openings 21a in other embodiments.

Figure 7:
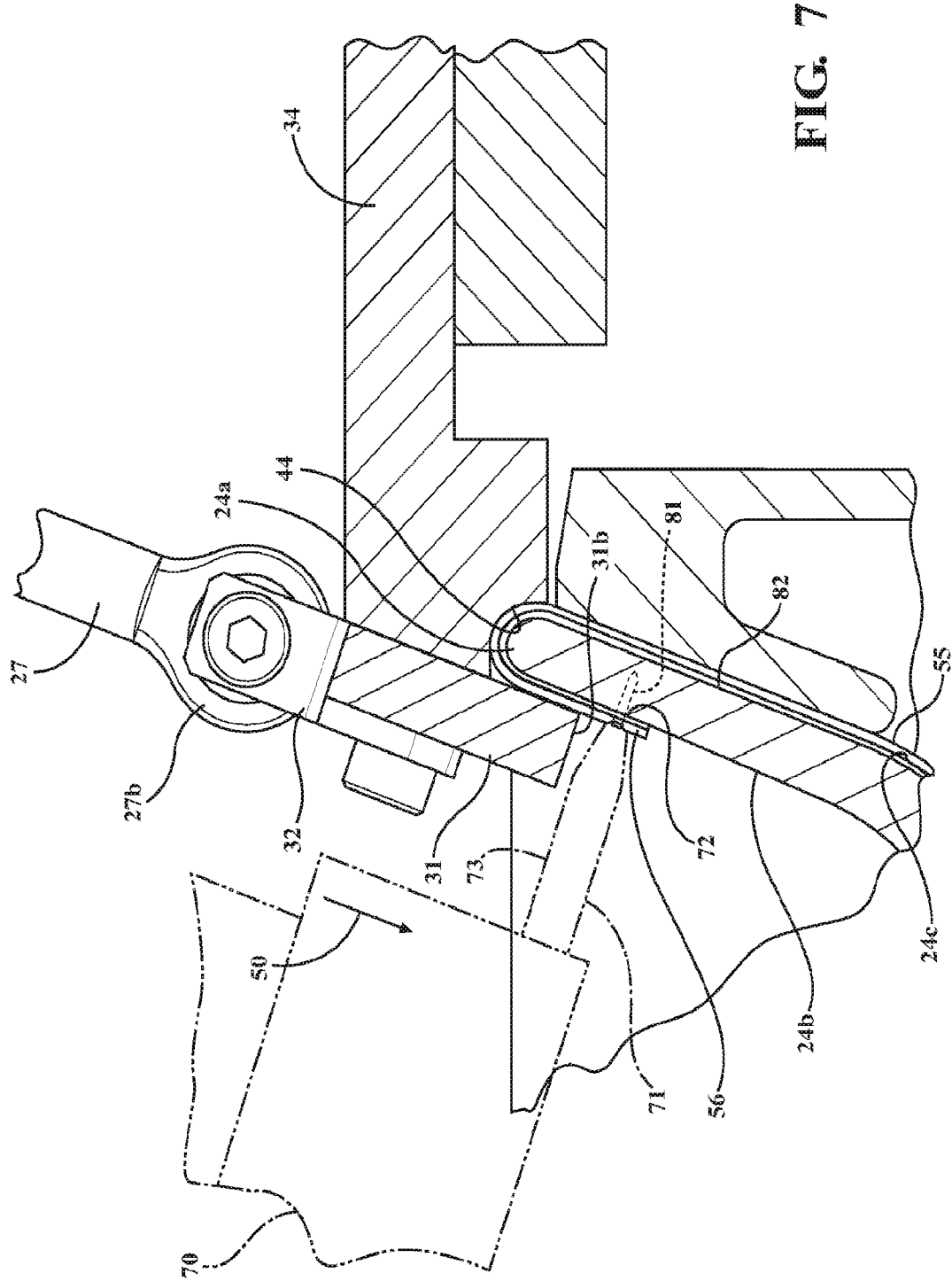
FIG. 7 close-up view of a portion of FIG. 5 further including a fastening mechanism of an interface between material folder, stapler head and material.

As noted above, the automated wrapping system 20 also includes a fastening mechanism that is used to attach the material 55 to the substrate 24. The fastening mechanism, such as a stapler 70 having a stapler head 71, is shown in FIG. 7. An interface 72 of the stapler head 71 and the free end portion 56 of the material 55 is also shown in FIG. 7 that provides the location for the affixing of the staples 81. The bottom edge 31b of the material folder 31 provides a guide for ensuring consistent and accurate positioning of the interface 72 relative to the free end portion 56 of the material 55. This precision further reduces the extra material needed to secure the material 55 to the substrate 24. As appreciated, the free end portion 56 of the material 55 will be secured to the substrate 24 along the inner portion 24b. This can be accomplished by moving the fastening mechanism, such as the stapler 70, or by rotating the substrate 24 about the inner portion 24b relative to the fastening mechanism. The rotation can be accomplished on a carousel (not shown) as known in the industry. It is to be appreciated that any suitable fastening mechanism could be employed.

In certain embodiments, a bevel 73 is added to the stapler head 71 that corresponds to a corresponding outer profile shape of the bottom edge 31b of the material folder 31. Alternatively, a bevel (not shown) can be added to the bottom edge 31b of the material folder 31 to correspond to the outer profile shape of the stapler head 71. In this way, the stapler 70 can be more precisely guided to a position adjacent to the free end portion 56 of the material 55 to apply the staples to fasten the free end portion 56 to the inner portion 24b of the substrate 24. Accordingly, the variation of the location of the staples used to fasten the material 55 to the substrate 24 can be minimized on a part to part basis.

The general method of operation, in the embodiment of FIGS. 1-7, is as follows. The trim/material 55 is loaded into the nest 21, preferably while a vacuum (not shown) is operational and inserted within the openings 21a or 21b. The stitching 83 on the material 55 is aligned, and the location of the stitches 83 of the material 55 is checked, and re-checked after any necessary adjustment. The vision system 77, and/or camera system 79, used as the alignment system 75 may provide a green light or some form of feedback indicating that the material 55 is properly aligned on the nest 21. The substrate 24 is then loaded against the trim/material 55 such that the outer portion 24b is positioned adjacent to the trim/material 55. The alignment of the stitching is re-checked. The vision system 77 and/or camera system 79, used in the alignment system 75 may provide a green light or some form of feedback indicating that the material 55 remains properly aligned on the nest 21.

The platen 45, if utilized, is then lowered into position to apply the desired pressure to the substrate 24 and to compress the foam layer 82. The biasing slide 34 is then moved to the operational, or biasing position, wherein the retainer section 44 holds the material 55 against the edge 24a of the substrate 24. The material folding assembly 25 is then activated, wherein the actuator 46 moves the material folding assembly 25 and sub-assembly 39 from the rest position to the actuated position. The platen 45, and the material folding system 25, could be activated simultaneously, or in any suitable sequence. The material folder 31 is moved into the actuated position wherein it holds, folds, pulls and otherwise tensions and secures the trim/material 55 to the substrate 24, and in particular folds the free end portion 56 of the material 55 over the edge 24a and onto a part of the inner portion 24b of the substrate 24. The platen 45 is then preferably raised/retracted. The fastening mechanism, such as the stapler 70, is moved into position, either manually or automated, to secure staples 81 (see FIG. 1) into the free end portions 56 of the material 55 to the substrate 24. After the staples 81 or other fasteners are inserted, the material folder 31 is retracted to the rest position and the retainer section 44 is withdrawn to a non-operational position (i.e., a non-biasing position). The finished part 100, having the material 55 secured to the substrate 24 with the free end portions 56 adjacent to the inner portion 24b of the substrate 24, can now be removed from the nest 21.

Figure 8:
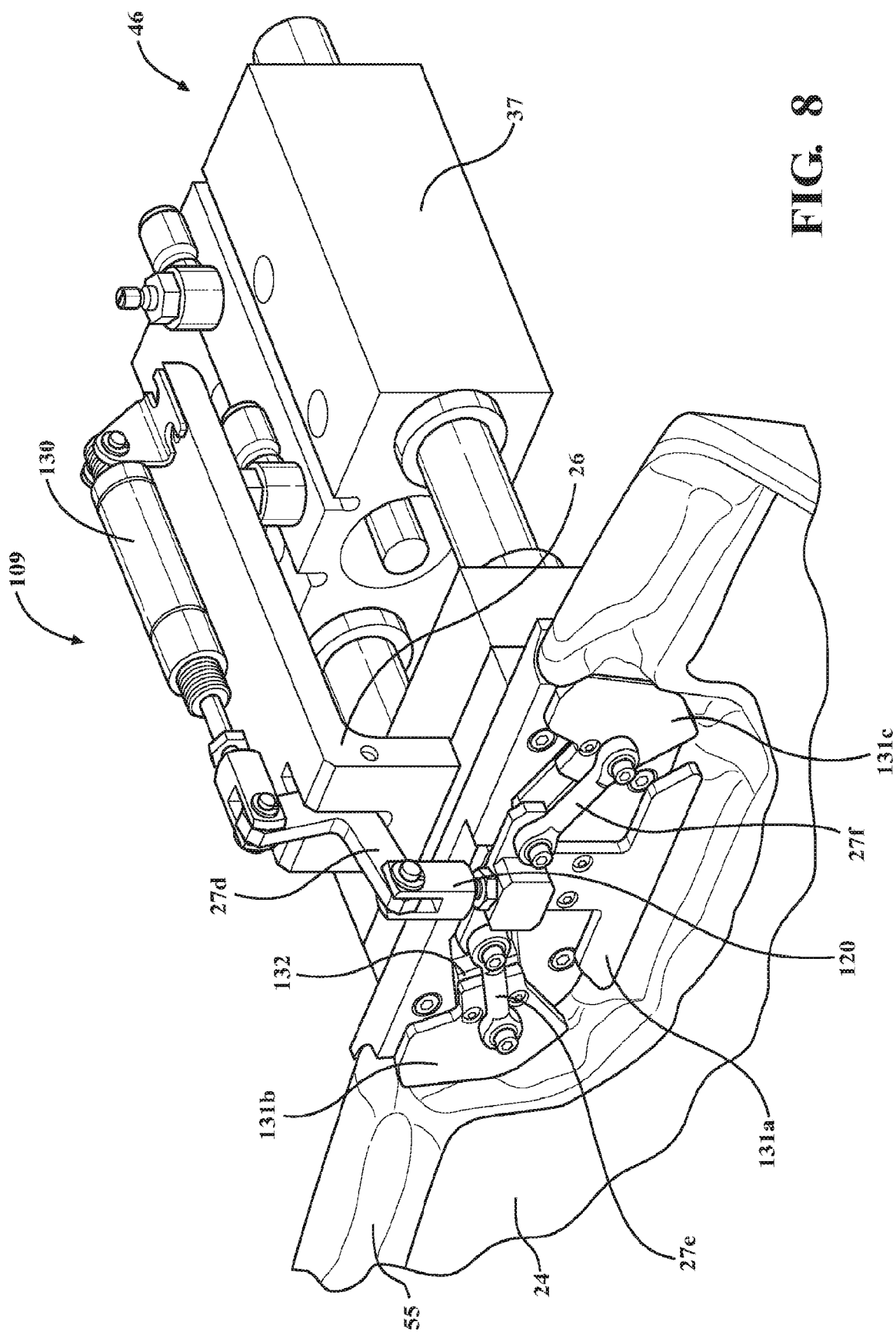
FIG. 8 is a perspective view of an alternative embodiment of the automated wrapping system with a material folding assembly having a sub-assembly in a rest position.
Figure 9:
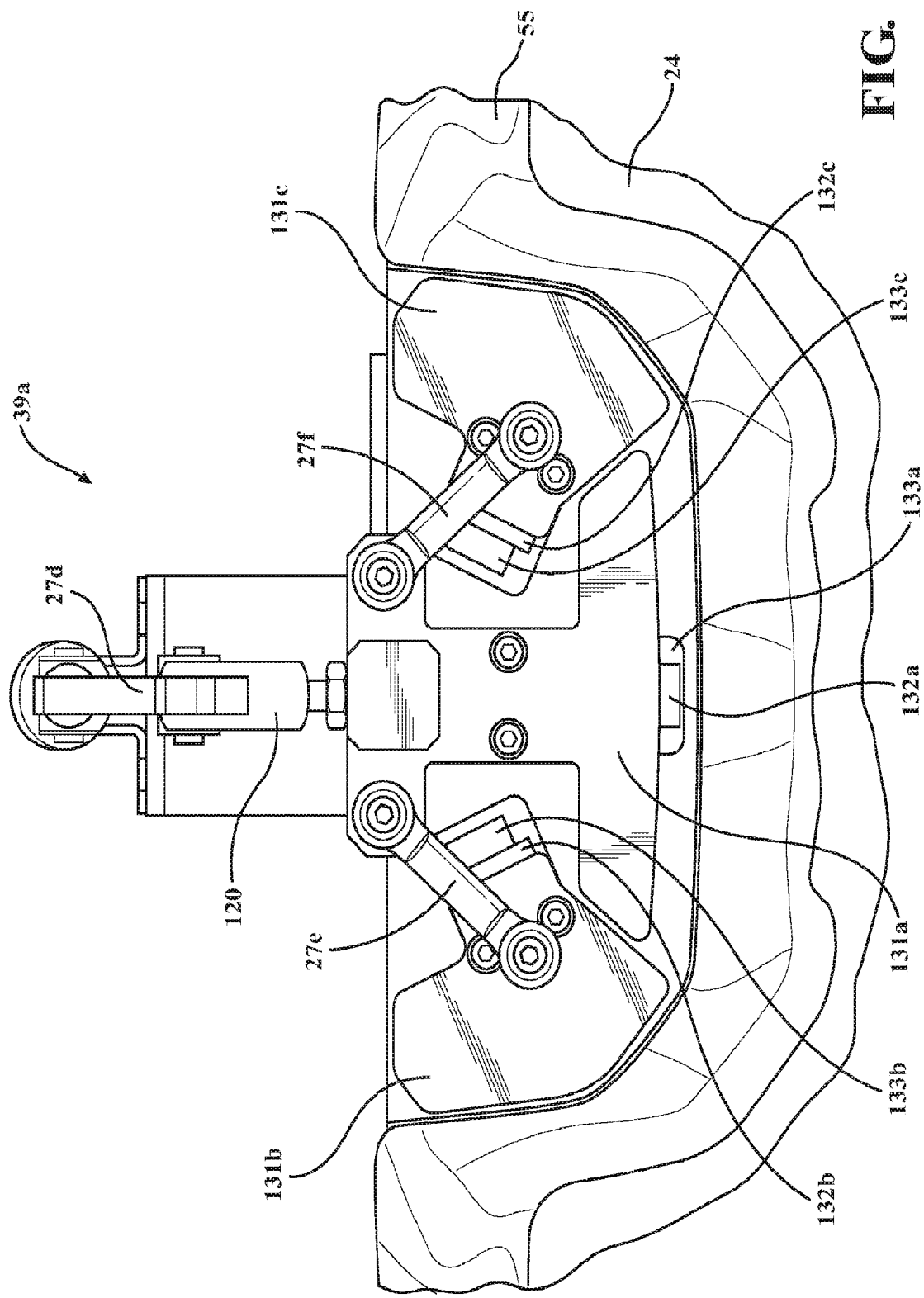
FIG. 9 is a front view of a material folding assembly of the alternative automated wrapping system of FIG. 8 with the sub-assembly in the rest position.
Figure 10:
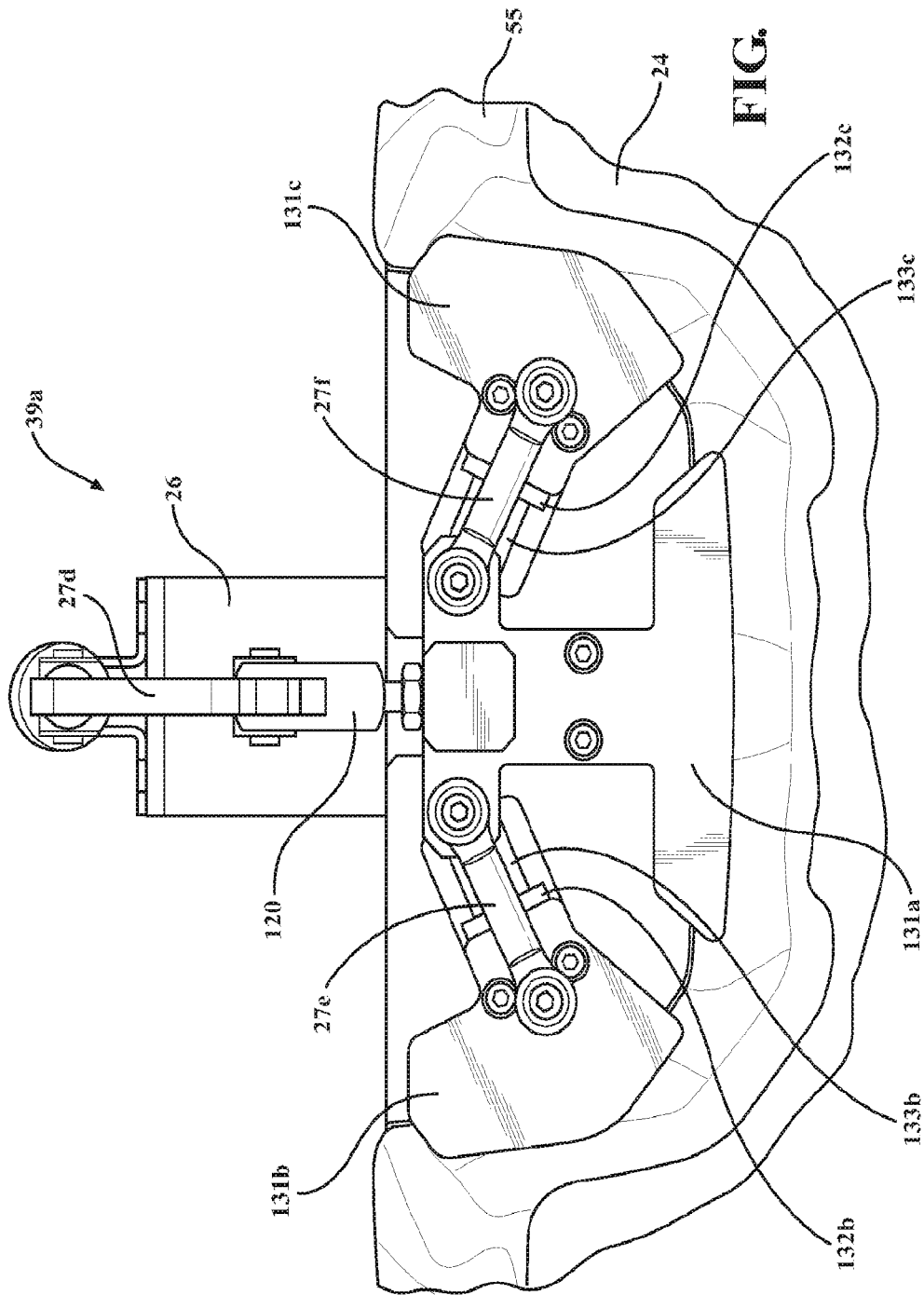
FIG. 10 is a front view of a material folding assembly of the alternative automated wrapping system of FIG. 8 with the sub-assembly in the actuated position.

FIGS. 8-10 illustrate an alternative embodiment to the embodiment provided in FIGS. 1-7, where the material folder 31 has a different configuration. This configuration allows for the same securing process to occur on non-linear shapes. Specifically, the modified sub-assembly 109 provided herein includes three material folders 131a, 131b, and 131c that all actuate in concert with each other. Each material folder 131a, 131b, 131c has a respective folder slide 132a, 132b, 132c that moves along a respective moveable mount 133a, 133b, 133c. The actuation rod 27 is now an l-shaped rod 27d and is connected to a journal 120, which in turn leads to two additional actuation rods 27b and 27c which are connected to a respective one of the two additional material folders 131b and 131c. Again, it is to be appreciated that the sub-assembly 109 can be of any suitable configuration so long as the material 55 is properly held into position about an edge of the substrate.

In this embodiment, the actuation of the sub-assembly 109 from the rest position (see FIG. 9) to the actuated position (see FIG. 10) is accomplished wherein the air cylinder 38 is activated and the cylinder rod 39a pushes on the end block 26 in a manner similar to what is described in the embodiment of FIGS. 1-7 above. The actuation rod 27d pivots around its pivot point which is now located at the intersection of the "l" where the rod 27d is pinned to the end block 26, and applies downward force of the journal 120. The journal 120 translates the downward force onto the material folder 131a, and also translates the downward force to the additional actuation rods 27b and 27c. The translated force on the additional actuation rods 27e and 27f, applied in a transverse direction relative to the downward force, causes the additional material folders 131b and 131c to move outwardly away from the actuation rods 27e and 27f (see FIG. 10). The movement of the material folders 131a, 131b, and 131c corresponding to the actuated position of the sub-assembly 109 in turn pulls, stretches, or otherwise tensions the free end portions 56 of the trim/material 55 about the edge 24a and inner portion 24b of the substrate 24 in a manner similar to what occurs in the embodiment of FIGS. 1-7. Finally, and similar to the embodiment of FIGS. 1-7, a fastening mechanism such as a stapler 70 may then be utilized to secure the free end portions 56 of the trim/material 55 to the inner portion 24b of the substrate 24.

While also not illustrated, the embodiment of the automated wrapping system 20 provided in FIGS. 8-10 also may also use a platen or pressure plate 45 as a part of the automated wrapping system 20 to apply pressure against the interior surface of the substrate 24 in the manner described in the first embodiment above in FIGS. 1-7.

Figure 11:
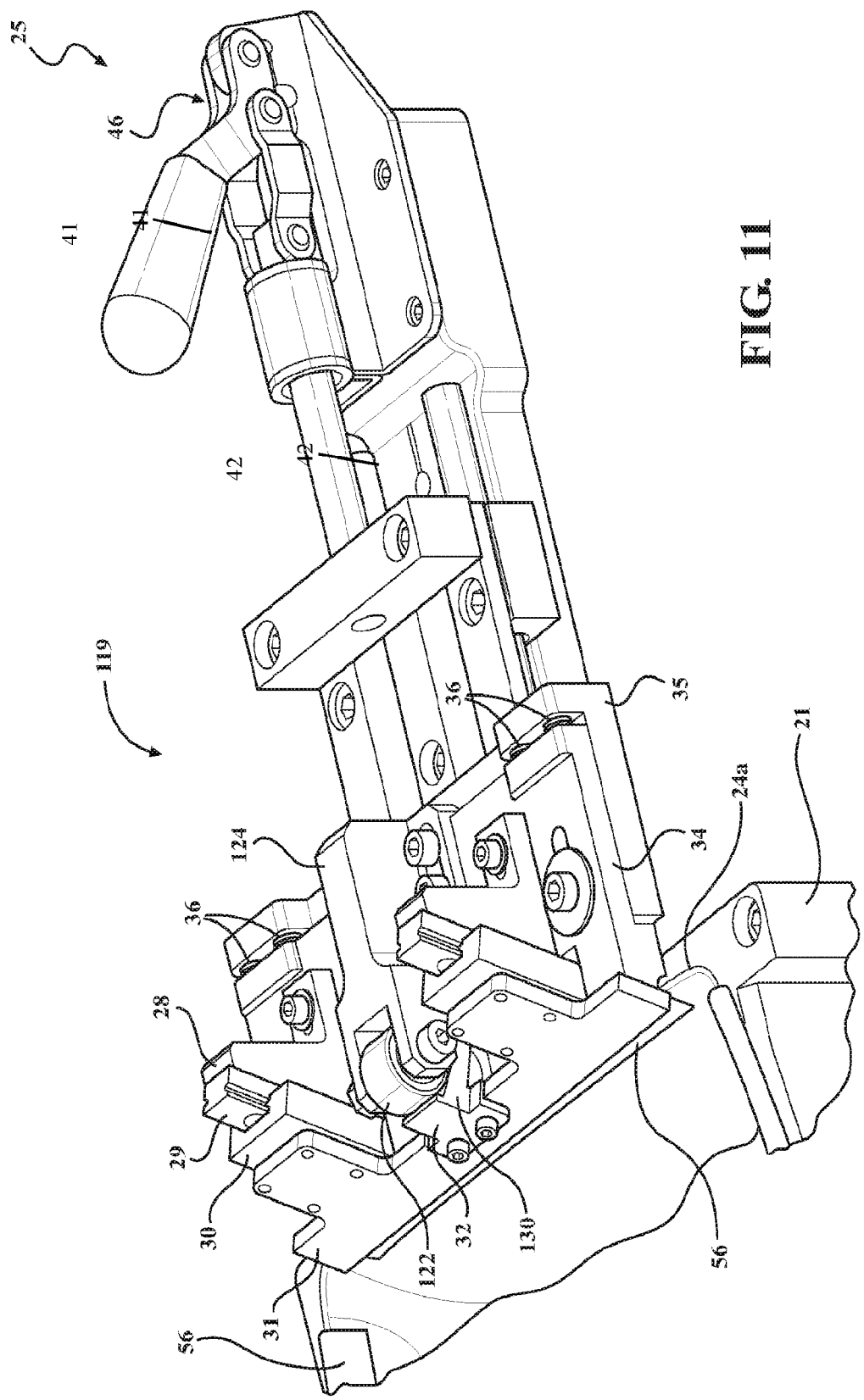
FIG. 11 is a perspective view of an alternative embodiment of a material folding assembly having a sub-assembly in a rest position.
Figure 12:
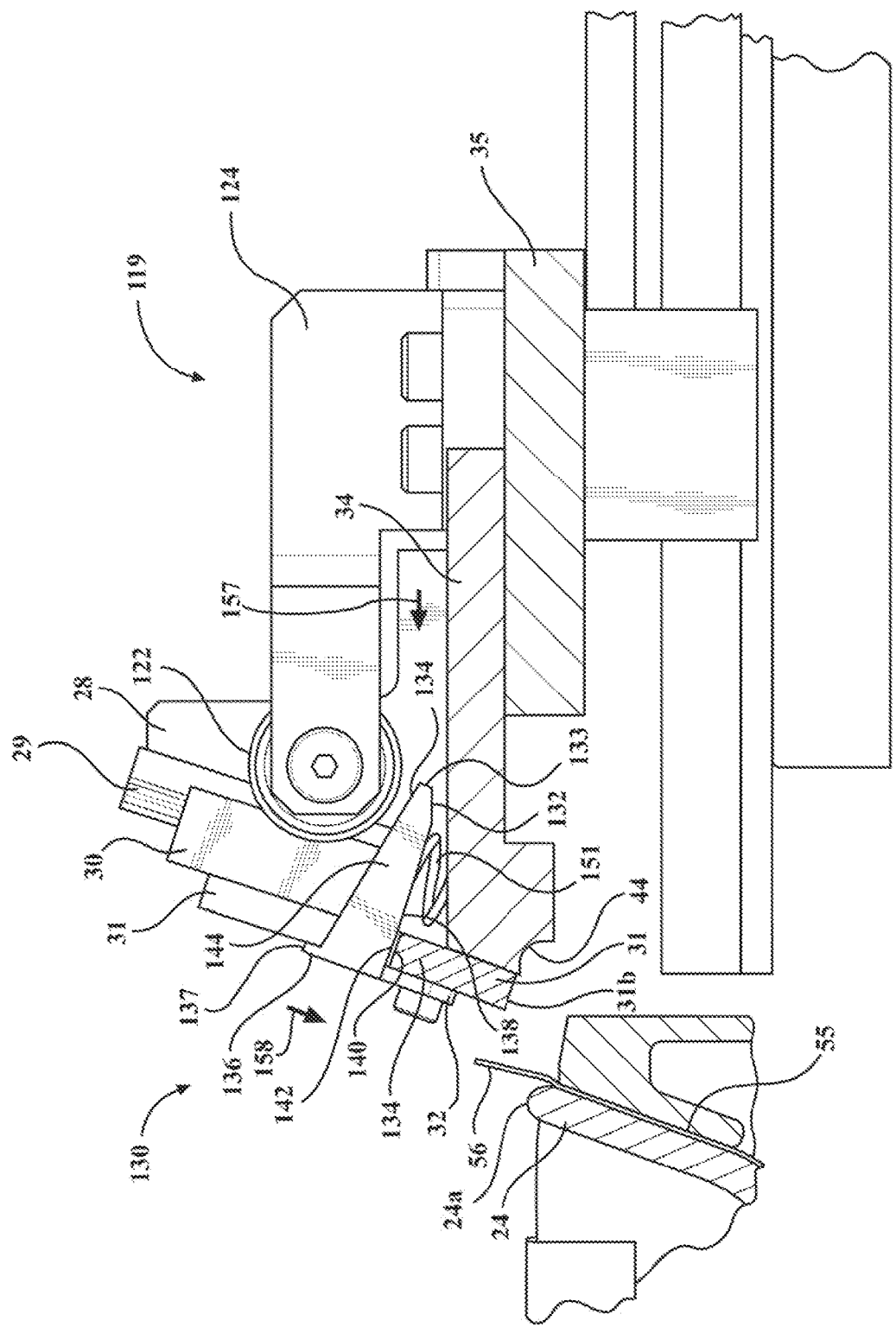
FIG. 12 is a perspective view of the material folding assembly of FIG. 11 having the sub-assembly in the rest position and the biasing slide in a non-operational position.
Figure 13:
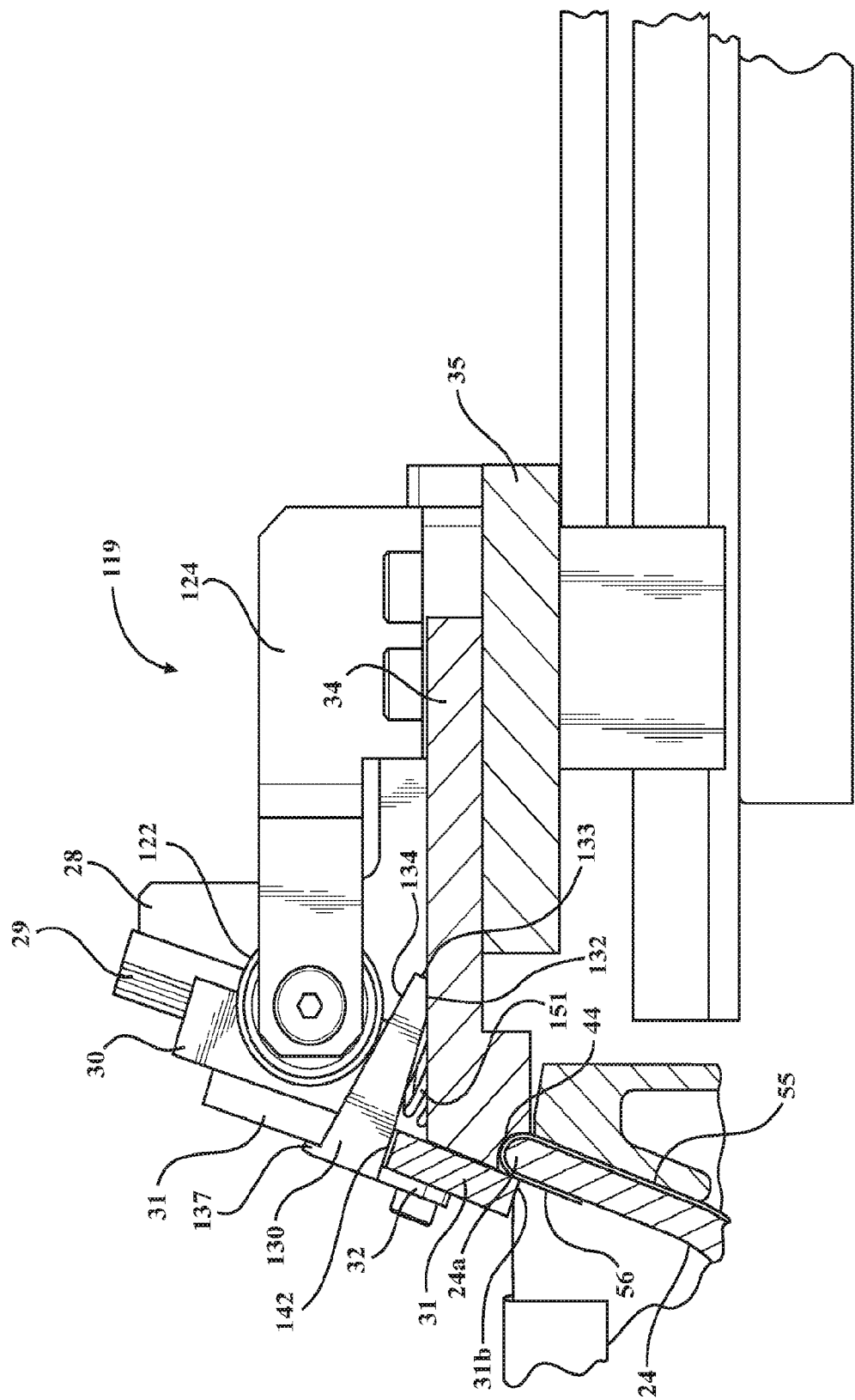
FIG. 13 is a perspective view of an automated wrapping system with the material folding assembly of FIG. 11 having the sub-assembly in an actuated position and the biasing slide in an operational or biasing position.

In yet another alternative embodiment, as illustrated in FIGS. 11-13, the material folding system 25 includes a modified sub-assembly 119 that moves from a rest position to an engaged position. The sub-assembly 119 includes a number of operative components that were previously described with respect to the sub-assembly 39 of FIGS. 1-7 above (with those common components referred to by the same reference number as in the embodiment above), as well as additional or different components as described below, but can include more or less components without deviating from the overall scope of the invention. The actuation rod 27 and end block 26 have been replaced by a cam slide type of arrangement for moving the material folder 31 and slide folder 30.

In particular, as illustrated in FIGS. 11-13, the sub-assembly 119 includes a cam wheel 122 pivotally coupled to a cam end block 124, with the cam end block 124 being coupled to the biasing slide 34. The sub-assembly 119 also includes a ramp 130 fixedly coupled to the connector 32 and seated on the biasing slide 34 between the end block 124 and the material folder 31. The ramp 130 has a bottom surface 132 positioned adjacent to the biasing slide 34 and an upper inclined surface 134 extending transverse to, and away from, the biasing slide 34 and an inner edge 133 of bottom surface 132. Preferably, the contour of the bottom surface 132 corresponds to the corresponding contour of the biasing slide 34, and most preferably the contour of the bottom surface 132 and the corresponding portion of the biasing slide 34 are flat. The upper inclined surface 134 terminates into a stop portion 136 having a flange portion 137 extending in a direction transverse to the upper inclined surface 134 in a direction away from the biasing slide 34 and bottom surface 132.

The ramp 130 also includes a lower inclined surface 138 extending transverse to, and away from, the biasing slide 34 that connects to the stop portion 136 along an outer edge 140. In certain embodiments, a plane defining the lower inclined surface 138 is parallel to a plane defining the upper inclined surface 134, while in other embodiments the planes may extend in a non-parallel arrangement. A terminal portion 142 of the lower inclined surface 138, located near the outer edge 140, is seated onto an upper connector surface 139 of the connector 32. A cam spring 151 is positioned between an inner portion 144 of the lower inclined surface 138 and the biasing slide 14, with the inner portion 144 located between the terminal portion 142 and bottom surface 132.

The cam wheel 122 is positioned on an upper inclined surface 134 of the ramp 130 and is configured to ride along the upper inclined surface 134 towards, or away, from the stop portion 136, depending upon whether the sub-assembly 119 is moving towards the rest position (see FIGS. 11 and 12 and 12A) or actuated position (See FIG. 13). A cam spring 151 is positioned between an inner portion 144 of the lower inclined surface 138 and the biasing slide 34, with the inner portion 144 located between the terminal portion 142 and bottom surface 132. The continuous biasing by the cam spring 151 automatically maintains the requisite force of ramp 130 against the cam wheel 122 regardless of the positioning of the cam wheel 122 on the upper inclined surface 134.

The actuator 46, here a hand actuating device 40 including a handle 41 and linkage 42, is remotely connected to the cam end block 124 to provide the actuation of the material folder 31. The actuation of the handle 41 by a user moves the linkage 42 to apply force that is translated to the cam end block 124 to move the cam end block 124 longitudinally in a direction towards the material folder 31 (shown by arrow 157 in FIG. 12), thereby causing the coupled cam wheel 122 to move along the upper inclined surface 134 of the ramp 130 in a direction towards the stop portion 136. The movement of the cam wheel 122 longitudinally towards the stop portion 136 applies force on the upper inclined surface to move the ramp 130 in a direction towards the biasing slide 34 that compresses the cam spring 151. The force applied to the upper inclined surface 134 to move the ramp 130 is translated to the upper connector surface 139 of the connector 32 to move the connector 32, which in turn causes the material folder 31 (shown by arrow 159 in FIG. 13158 in FIG. 12) coupled to the connector 32 to move downward such that the sub-assembly 119 is moved to the actuated position to hold, fold, pull and otherwise tension and secure the free end portion 56 of the trim/material 55 to the inner portion 24b of the substrate 24 while the retaining section 44 holds the material 55 against the edge 24a of the substrate 24 in the same manner as described above with respect to the movement of the sub-assembly 39 of the first embodiment to the actuated position as described in FIGS. 1-6 above, including wherein the biasing slide 34 is moved to an operational or biasing position such that that retainer section 44 engages the free end portion 56 of the material 55 extending outwardly from the nest 21 to hold this free end portion 56 of the material 55 in position against an edge 24a of the substrate 24 prior to the movement of the material folder 31 to the actuated position. The biased position and rest position, wherein the retainer section 44 of the biasing slide 34 is positioned to hold the material 55 against the edge 24a of the substrate but wherein the material folder is in raised position corresponding to the rest position, is illustrated in FIG. 12A wherein the free end portion 56 is folded over the edge 24a of the substrate 24 but is not positioned against a part of the inner portion 24b of the substrate 24.

Once in the actuated position and wherein the biasing slide 34 is in the biased position (see FIG. 13), and similar to the description above in the first embodiment in FIG. 7, a fastening mechanism such as a stapler 70 can be used to secure the free end portion 56 of the trim/material 55 to the inner portion 24b of the substrate 24 with staples 74 or a similar fastening device as also described above.

As noted above, the illustrated embodiment of FIGS. 11-13 include a hand actuating device 40 as the actuator 46. However, an actuator 46 as in FIGS. 1-7 and 8-10, including the air cylinder 38 and air cylinder mount 37, could also be utilized as the actuator 46 in the embodiment of FIGS. 11-13. Similarly, the hand actuating device 40 can be utilized as the actuator 46 in the embodiments as in FIGS. 1-7 and 8-10.

While also not illustrated, the embodiment of the automated wrapping system 20 provided in FIGS. 11-13 may also use a platen or pressure plate 45 as a part of the automated wrapping system 20 to apply pressure against the interior surface of the substrate 24 in the manner described in the first embodiment above in FIGS. 1-7.

Figure 14:
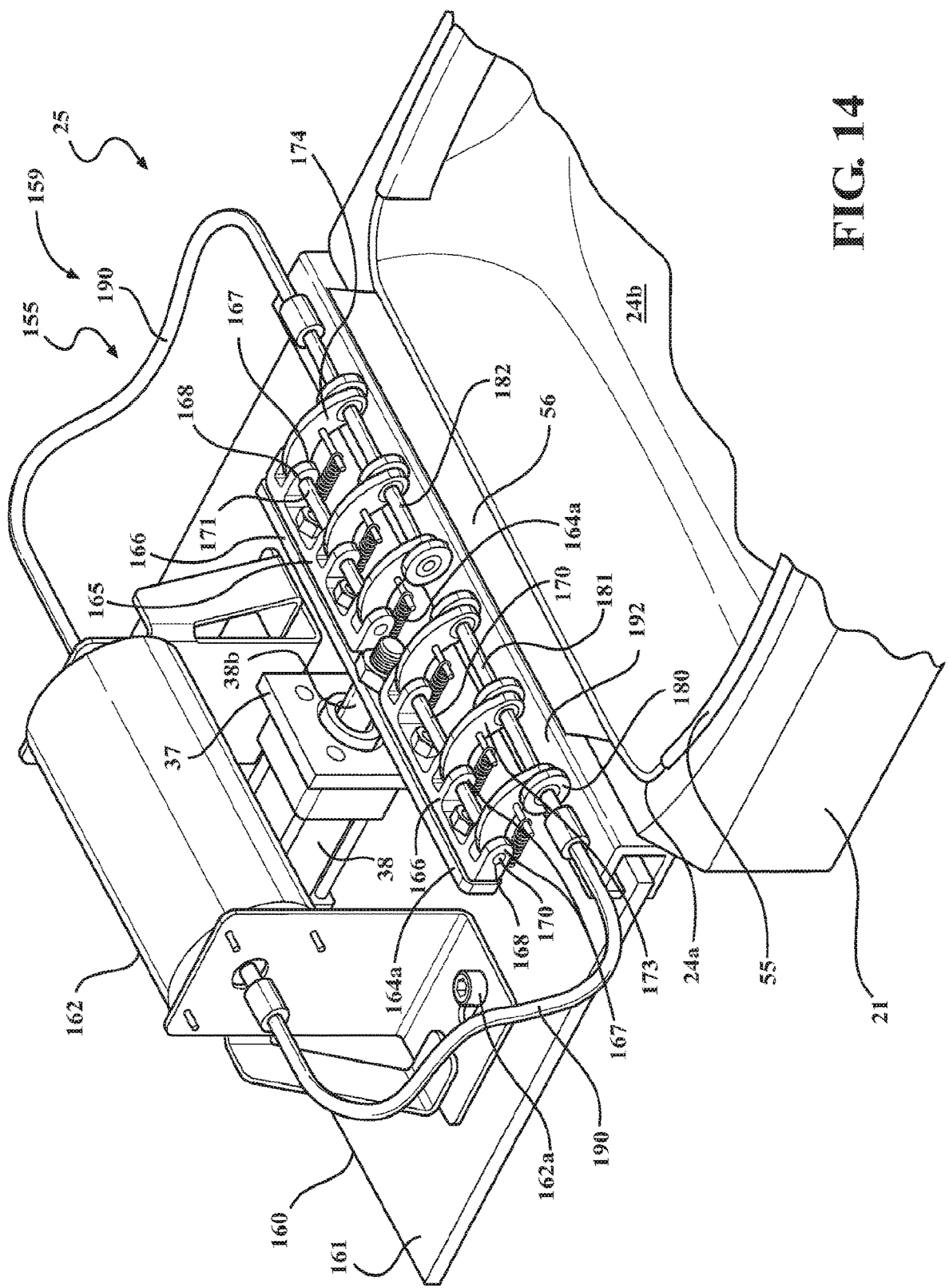
FIG. 14 is a perspective view of an alternative embodiment of a material folding assembly having a sub-assembly in a rest position.
Figure 15:
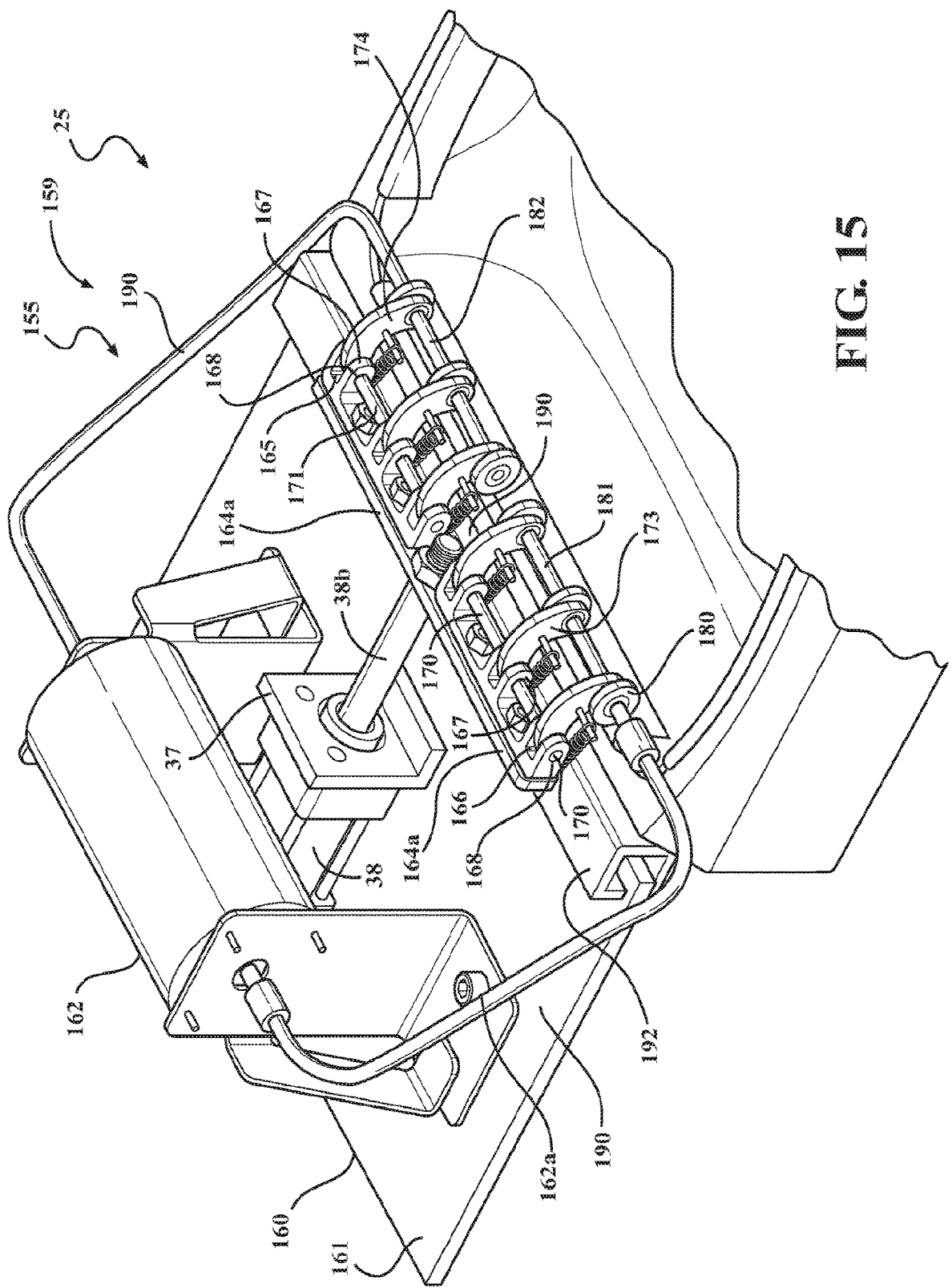
FIG. 15 is a perspective view of the material folding assembly of FIG. 15 having the sub-assembly in the actuated position.

In still another alternative embodiment of the subject invention, as provided in FIGS. 14-15, the material folding system 25 includes a sub-assembly 155 that includes a wheel assembly 159 including one or more wheels 180 which contact the free end portion 56 of the material 55 and fold the material over the edge 24a of the substrate and onto the inner portion 24b in a similar manner to the material folders 31, 131a, 131b, 131c of the embodiments shown in FIGS. 1-13 above.

In particular, the material folding system 25 as illustrated in FIGS. 14-15, includes a moveable sub-assembly 155 coupled to a base 160, with the sub-assembly 155 moveable between the rest position and the actuated position in a manner similar to the previous embodiments described above in FIGS. 1-13.

In general, the sub-assembly 155 of the embodiment of FIGS. 14-15 includes a wheel assembly 159 which includes one or more wheels 180. The actuator 46 is connected to the wheel assembly 159 and is configured for sliding and pivoting the wheel assembly 159 relative to the base 160 between a wheel non-engaged state and a wheel engaged state, with the wheel non-engaged state corresponding to the rest position and the wheel engaged state corresponding to the actuated positon. The movement of the wheel assembly 159 from the wheel non-engaged state to the wheel engaged state causes the one or more wheels 180 to engage and fold the free end portion 56 of the material 55 over the edge 24a of the substrate 24 and onto inner portion 24b of the substrate 24, as will be described in further detail below.

In particular, the wheel assembly 159 includes a motor 162 coupled to, and preferably affixed to, a top surface 161 of the base 160 through one or more adjustment screws 162a. A shaft retainer 164 is slidably coupled to the top surface 161 of the base 160 and is slidable relative to the top surface 161 of the base 160 in a longitudinal direction toward or away from the nest 21 between a first retainer position (see FIG. 14) and a second retainer position (see FIG. 15).

As illustrated, the shaft retainer 164 includes a pair shaft retainers portions 165, 166 extending from, and secured to, a rearward shaft connector 164a. Each shaft retainer portion 165, 166 includes two or more spaced apart flanges 167 extending from a rearward plate portion which is aligned with, and preferably fixed to, the rearward plate portion. Each of the flanges 167 includes axially aligned openings 168.

The sub-assembly 155 also includes a first wheel shaft 170 that is coupled through the axially aligned openings 168 of the flanges 167 within the first shaft retainer portion 165, and an additional first wheel shaft 171 that is coupled through the axially aligned openings 168 of the flanges 167 within the second shaft retainer portion 166.

The sub-assembly 155 also includes one or more wheel links 173 pivotally coupled to the first shaft wheel shaft 170, and one or more wheel links 174 pivotally coupled to the additional first shaft wheel shaft 171, with each of the wheel links pivotally coupled to the respective wheel shaft 170, 171 between a respective adjacent pair of the two or more flanges 167.

In particular, each of the wheel links 173, 174 has a first opening that respectively receive one of the first shaft wheel shafts 170, 171 and also include a second opening remote and opposite from the first opening that receives a respective one of a second wheel shaft. Accordingly, each of the wheel links 173 is pivotally coupled to the first wheel shaft 170 and the second wheel shaft 181, while each of the wheel links 174 is pivotally coupled to the first wheel shaft 171 and the second wheel shaft 182.

Figure 16:
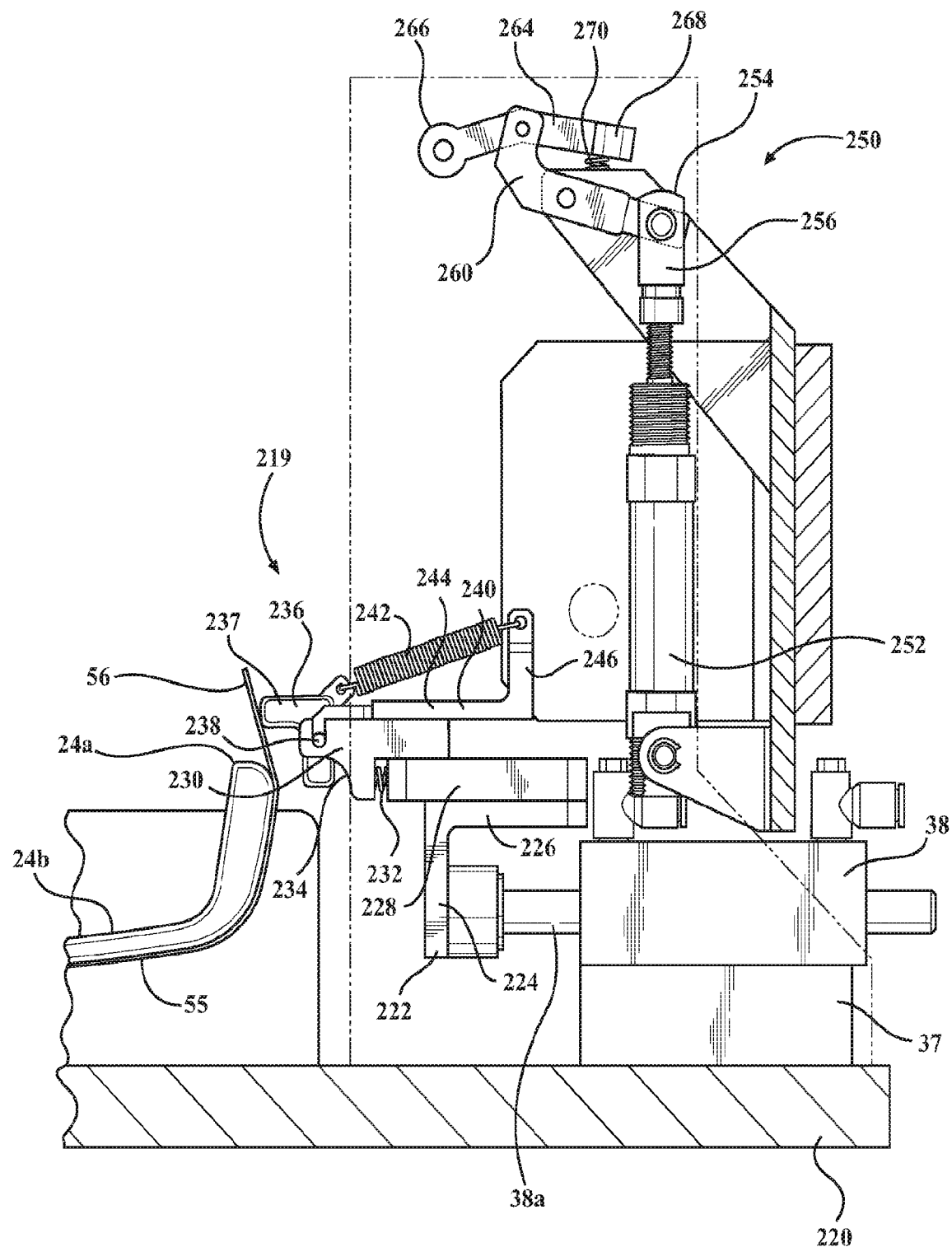
FIG. 16 is a side perspective view of an alternative embodiment of the automated wrapping system with a material folding assembly having a sub-assembly in a rest position and a stretching device in a non-engaged position.

As noted above, the wheel assembly 159 also includes one or more wheels 180. In particular, and as illustrated in FIGS. 14-15, a plurality of wheels 180 are coupled to each one of the respective second wheel shafts 181, 182. In certain embodiments, such as illustrated in FIGS. 14-16, the number of wheels 180 on each second wheel shafts 181, 182 corresponds to the number of wheel links 173, 174 pivotally coupled to each second wheel shaft 181, 182, while in other embodiments the number of wheels 180 may be different than the number wheel links 173, 174.

The wheel assembly 159 also includes a drive cable 190 that is coupled to each one of the respective second wheel shafts 181, 182 and to the motor 162. Accordingly, upon actuation of the motor 162, the respective second wheel shafts 181, 182 rotate in a first rotational direction, or in a second rotational direction opposite the first rotational direction.

As noted above, the automated wrapping system 20 in the embodiment of FIGS. 14-15 also includes an actuator 46. In particular, the actuator 46 is in the form of a cylinder 38 having a cylinder support 37 seated on the base 160. The cylinder 38 includes a cylinder rod 38a that is secured through the rearward shaft connector 164a of the shaft retainer 164 with a cylinder nut. In alternative embodiments, the actuator 46 could be in the form of a hand actuation device 40 as described above with respect to the embodiment described in FIGS. 11-13.

The wheel assembly 159 may also include a wheel rest 190 that is coupled to an end portion of the base 160 at a position adjacent to the nest 21. When the sub-assembly is in the rest position, the one or more wheels 180 are positioned adjacent to a top surface 192 of the wheel rest 190.

When the actuator 46 is actuated to move the sub-assembly 155 from the rest position to the actuated position, the wheel assembly 159 in turn is moved from the wheel non-engaged state to the wheel engaged state. In particular, the cylinder rod 38a of the actuated actuator 46 is extended outwardly in a direction towards the nest 21 and applies a force to the shaft retainer 164. In response, the shaft retainer 164 slides along the base in a longitudinal direction from the first retainer position (see FIG. 14) to a second retainer position (see FIG. 15). The sliding movement of the shaft retainer 164 towards the nest 21 in turn moves the first wheel shafts 170, 171; the wheel links 173, 174; the second wheel shafts 180, 181; and the wheels 180. In particular, the wheels 180 and coupled second wheel shafts 181, 182 are extended outward beyond the end of the wheel rest 190 and over the nest 21 and are brought into contact with the free end portion 56 of the material 55 at a position generally above the edge 24a of the substrate 24 when the sub-assembly 155 is placed in the actuated position. Once beyond the end of the wheel rest 190, the wheels 180 begin to move downward due to the force of gravity as well as outward from the wheel rest 190, with the downward and outward movement controlled by the pivoting of the wheel links 173, 174 about their respective pivot points corresponding, respectively, at one end about the length of the first wheel shafts 170, 171 and at the opposing end by the length of the second wheel shafts 181, 182. The continued outward and downward movement of the wheels 180 folds the free end portion 56 of the material 55 over the edge 24a of the substrate 24 such that it is brought into contact with the inner portion 24b when the sub-assembly 155 reaches the actuated position.

Once the sub-assembly 155 is in the actuated position, corresponding to the wheel engaged state of the wheel assembly 159, the motor 162 may then be actuated. The actuation of the motor 162 causes the coordinated rotation of the second wheel shafts 181, 182 (and the coupled wheels 180) through the drive cable 190 in either a first rotational direction or a second rotational direction opposite the first rotational direction.

When rotating in the first rotational direction, the wheels 180 engage the free end portion 56 of the material 55 to move in a first direction along the inner portion 24b of the substrate 24 away from the edge 24a, resulting in the stretching of the free end portion 56 portion of the material 55 in the first direction away from the edge 24a to create a tighter fit of the material 55 against the inner portion 24b. In addition, the remainder of the material 55 may also be stretched against the edge 24a and outer surface 24b of the substrate 24, resulting in a tighter fit of the material 55 to the substrate 24. When rotating in the second rotational position, the wheels 180 cause the free end portion 56 to move along the inner portion 24b in a direction towards the edge 24, creating a looser fit of the material 55 to the substrate 24. To determine whether to rotate the wheels 180 in either the first or second direction, a visual observation by the operator may be utilized to determine the fit of the material 55 to the substrate 24. Alternatively, and preferably, the alignment system 75 (with the vision system 77 and camera system 79) to view the stitching of the material relative to the substrate 24 may also be used to more precisely determine whether an adjustment of the tension, accomplished by rotation of the wheels 180, is desired. Accordingly, this embodiment provides a method therefore for enhancing the fit of the material 55 to the substrate 24 during the wrapping process.

Once in the actuated position and wheel engaged position, and wherein the free end portion 56 of the material 55 has been stretched by rotation of the wheels 180 in either the first or second rotational direction, as described above, and similar to the description above in the first embodiment in FIG. 7, a fastening mechanism such as a stapler 70 can be used to secure the free end portion 56 of the trim/material 55 to the inner portion 24b of the substrate 24.

While also not illustrated, the embodiment of the automated wrapping system 20 provided in FIGS. 14-15 also may also use a platen or pressure plate 45 as a part of the automated wrapping system 20 to apply pressure against the interior surface of the substrate 24 in the manner described in the first embodiment above in FIGS. 1-7.

Figure 17:
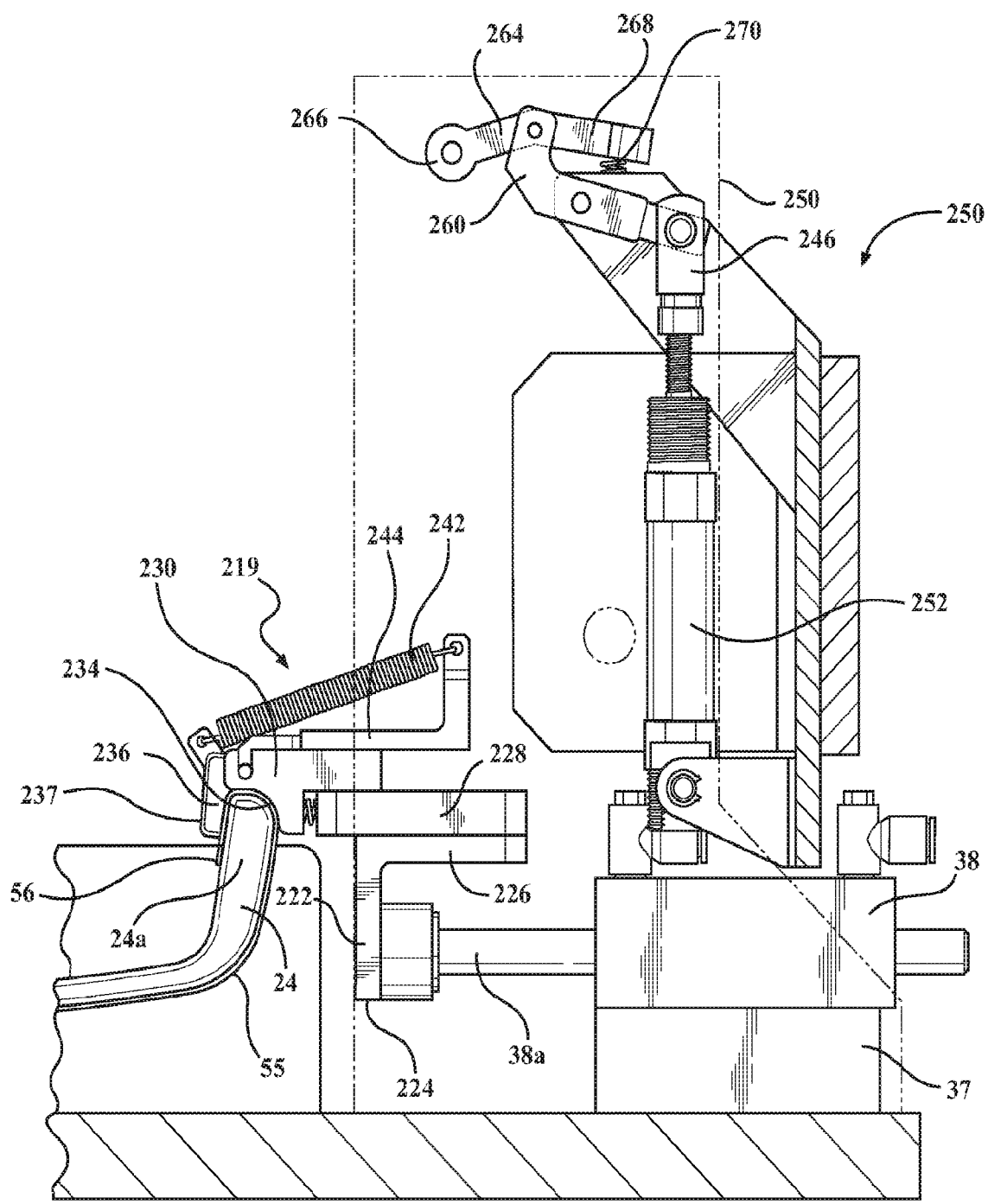
FIG. 17 is a perspective view of the material folding assembly of FIG. 16 having the sub-assembly in the actuated position and a stretching device in the non-engaged position.
Figure 18:
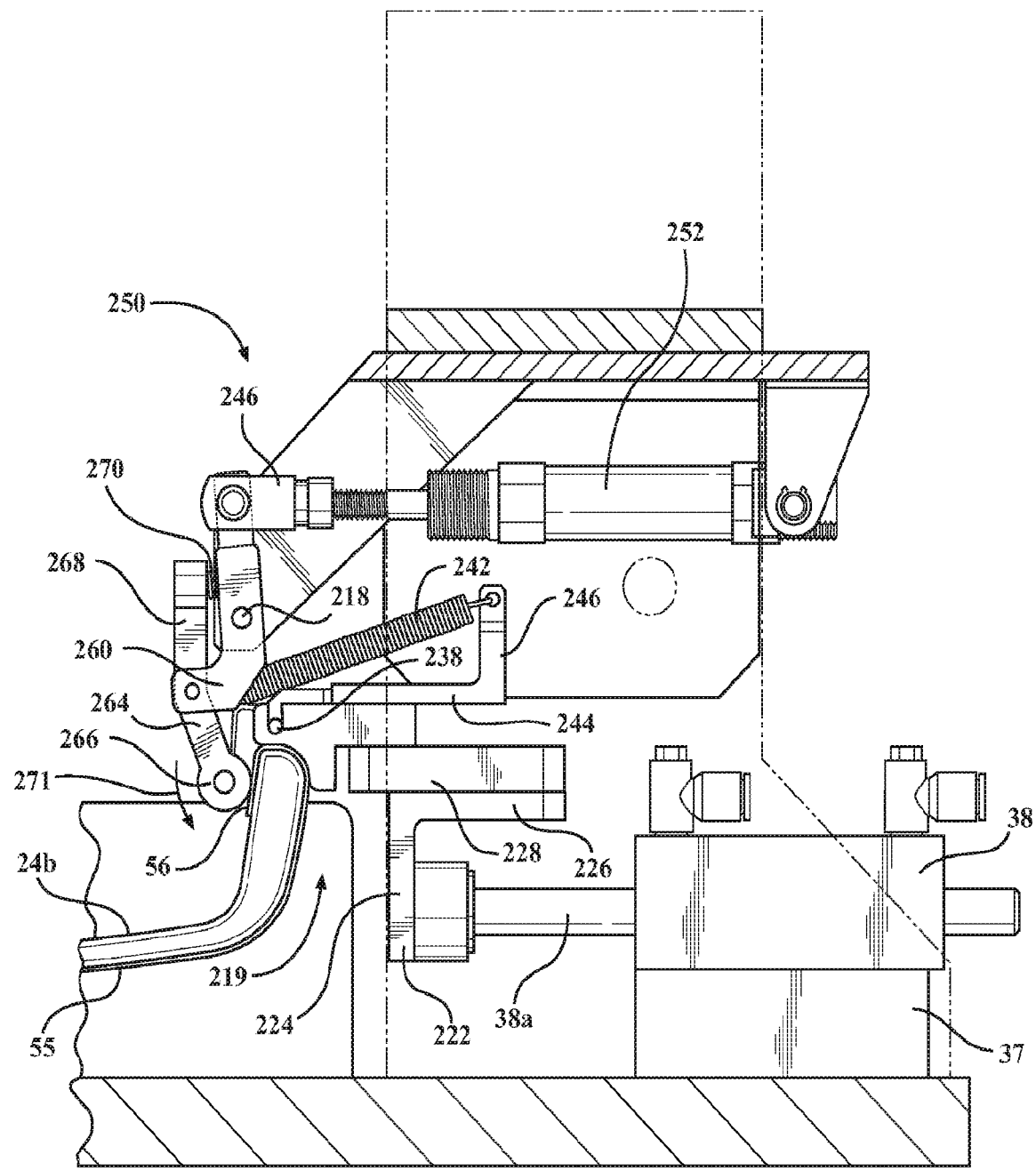
FIG. 18 is a perspective view of the material folding assembly of FIG. 16 having the sub-assembly in an actuated position and the stretching device in an engaged position.
Figure 19:
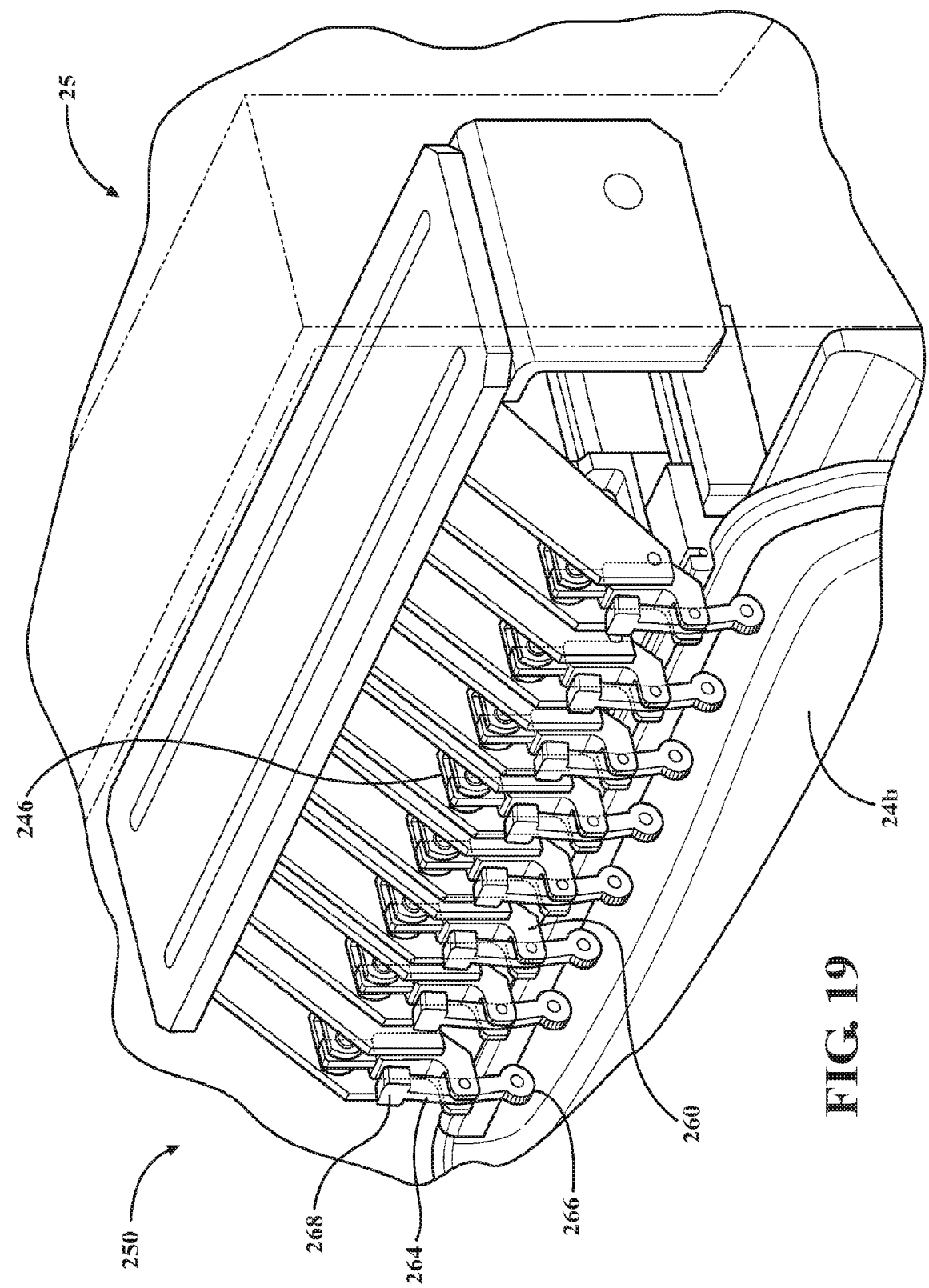
FIG. 19 is a close-up perspective view of the stretching device of FIG. 18 in the activated position.

Referring now to FIGS. 16-19, yet another alternative embodiment of the automated wrapping assembly 20 is provided which includes material folding assembly 25 includes a modified sub-assembly 219 moveable between the rest positon and the actuated position to engage and fold the free end portion 56 of the material 55 to the substrate 55 in a similar manner to that described in the alternative embodiments above (the material 55 is omitted from FIG. 19). In this embodiment, a stretching device 250 may optionally also be included that works in conjunction with the material folding assembly 25 to further stretch the free end portion 56 of the material 55 along the inner portion 24b prior to fastening, as will be described further below.

In this embodiment, the sub-assembly 219 is positioned on a base 220 that is located adjacent to the nest 21. Referring now to FIGS. 16-18, the sub-assembly 219 includes an end block 222, preferably an l-shaped end block 222, having a first leg 224 extending in a direction towards the base 220 and a second leg 226 extending transverse to the first leg 224. In certain embodiments, the length of the second leg 226 is parallel to the length of the base 220. The actuator 46, here an air cylinder 38 having the cylinder rod 38a, is mounted to an air cylinder mount 37 which is seated on the base 220. The air cylinder 38 is connected to the first leg 224 of the end block 222 via the cylinder rod 38a and is configured to move the end block 222 towards, or away from the nest 21 between a first block position and a second block position. The first block position (see FIG. 18) corresponds to the rest position of the sub-assembly 219, while the second block position (see FIG. 19) corresponds to the actuated position.

The sub assembly 219 also includes a base block 228 that is coupled to, and preferably disposed on, the end block 222. A slide block 230 is adjustably and fixedly coupled to the base block 228 using an adjustable fastener 232, best illustrated in FIGS. 18 and 19 as a screw. The slide block 230 has a retainer section 234 configured for engaging the material 55 and holding the material 55 against an edge 24a of the substrate 24. Similar to the retainer section 44, the retainer section 234 can include a contoured engagement surface to enhance the gripping of the material 55 along the edge 24a of the substrate The sub assembly 219 also includes an l-shaped flange 236 pivotally coupled to the slide block 230 with a pin 238. The l-shaped flange 236 is pivotable about the length of the pin 238 (i.e., is pivotally moveable relative to the slide block 230) between a first pivoted position (see FIG. 16) and a second pivoted position (see FIG. 17). An l-shaped bracket 240 is seated on a top surface of the slide block 230. In particular the l-shaped bracket 240 includes a first leg 244 seated on the top surface of the slide block 230 and a second leg 246 extending transverse to the first leg 244 in a direction away from the slide block 230 and base 220. A spring 242 is coupled between the l-shaped flange 236 and the second leg 246 of the l-shaped bracket 240.

The stretching device 250, as best shown in FIG. 16-18, includes a pivotable assembly 252 pivotally moveable between a non-engaged position (see FIGS. 16 and 17) and an engaged position (see FIGS. 18 and 19).

The stretching device 250 has a linear actuator 252 that is coupled to a linkage 254 having a first arm 256 pivotally coupled to a second arm 258. An additional linkage 260 is pivotally coupled to the second arm 258. A biasing arm 264 is pivotally coupled to the additional linkage 260 and includes a finger portion 266 and an opposing spring biasing portion 268. A spring 270 is disposed between the second arm 258 and the spring biasing portion 268. The finger portion 266, when the stretching device 250 is in the engaged position and when the sub-assembly 219 is in the actuated positon, is configured to press against the free end portion 56 of the material 55 against the inner portion 24b of the substrate 24 to stretch the material 55 along the inner portion 24by of the substrate 24.

The operation of the automated wrapping assembly 20, in accordance with the embodiment of FIGS. 16-19, is as follows. First, the material 55 and substrate 24 are placed on the nest 21 in accordance with the manner described in each of the previous embodiments of FIGS. 1-15. Next, the alignment system 75 can be utilized to confirm that the material 55 is properly aligned as also described above. Next, and optionally, the platen 45 may be lowered onto the substrate 24 and material 55 within the nest 21 as described in the embodiments as described the embodiments above.

Next, the actuator 46 is actuated to move the material folding system 25 and sub-assembly 219 from the rest position to the actuated position, wherein the cylinder rod 38a of the air cylinder 38 contact and applies force to the first leg 224 of the end block 222 to move the end block 222 in a direction towards the nest 21 from a first block position (see FIG. 16) to the second block position (see FIGS. 17 and 18). The movement of the end block 222, in turn, moves the slide block 230 such that the retainer section 234 is positioned against the material 55 at a position corresponding to the edge 24a of the substrate 24. The movement of the slide block 230 also causes the pivoting movement of the l-shaped flange 236, wherein a first leg 237 of the l-shaped flange 236 contacts the free end portion 56 of the material 55 and folds the material 55 over the substrate edge 24a. The movement of the l-shaped flange 236 pivots the l-shaped flange 236 around an axis defined by the length of the pin 238, thereby folding the free end portion 56 onto the inner portion 24b (see also FIG. 17) and positioning the first leg 237 such that the free end portion 56 is between the first leg 237 and the inner portion 24b of the substrate 24. During this pivoting movement, the spring 242 is stretched between the l-shaped flange 236 and second leg 246 of the l-shaped bracket 240 to accommodate the pivoting movement.

While the embodiment as illustrated in FIGS. 16-18 illustrates the contacting of the l-shaped flange 236 to the free end portion 56 of the material 55 prior to the positioning of the retainer section 234 being positioned adjacent to the edge 24a of the substrate 24, in alternative embodiments the l-shaped flange 236 is coupled such that it contacts the free end portion 56 of the material simultaneous with or after the retainer section 234 being positioned adjacent to the edge 24a of the substrate 24. Accordingly, in instance wherein the retainer section 234 is first engaged, the retainer section 234 first holds the material 55 against the edge 24a of the substrate 24 prior to the l-shaped flange 236 engaging the free end portion 56 to fold the free end portion 56 over the edge 24a and into contact with the inner portion 24b of the substrate.

Next, and optionally, the alignment system 75 can be reactivated to confirm that the material 55 remains properly positioned after the actuation step. If the material 55 is not properly aligned, the sub-assembly 219 can be moved back to the rest position, and the material 55 realigned relative to the substrate 24. If the material 55 remains properly aligned as determined by the alignment system 75, the stretching device 250, where utilized, can be moved from the non-engaged position (see FIGS. 16 and 17) to the engaged position (see FIGS. 18 and 19).

In the engaged position, as shown in FIGS. 18 and 19, the assembly 252 is pivoted such that the finger portion 266 is engaged with the free end portion 56 of the material 55 opposite the inner portion 24*b*. The linear actuator 252 is then engaged to apply force to the first arm 256 of the linkage 254. The force to the first arm 256 pivots the second arm 258 at the pivot point, with the force then translated to the biasing arm 264, which pivots and moves slightly in a first direction (shown by arrow 271 in FIG. 18) to press the finger portion 266 into the free end portion 56 of the material 55 (the free end portion 56 and material 55 are omitted from FIG. 19) and pull the free end portion 56 of the material 55 away from the edge 24*a* along the inner portion 24*b* of the substrate. The spring 242 stretches slightly between the spring biasing portion 268 and the second leg 258 to accomplish this pivoting and first directional movement.

Next, and optionally, the alignment system 75 can be reactivated to confirm that the material 55 remains properly positioned relative to the substrate 24 after the free end portion 56 has been folded and stretched as described above. Finally, the fastening mechanism may be utilized to secure the free end portion 56 of the material 55 to the inner portion 24*b* of the substrate 24 in a manner described above.

The present invention thus provides a safer, more accurate, simpler, worker health conscious, efficient, faster, more economic and financially advantageous method to wrap, align, stretch and fasten material over substrates. The general method of operation, which can be utilized in any of the embodiments described above, is as follows. The trim/material 55 is loaded into the nest 21 while the vacuum, if utilized, is operational. The stitching on the material 55 is aligned, and the location of the stitches 83 (see FIG. 5) of the material 55 is checked, and re-checked after any necessary adjustment. The vision system 77, and/or camera system 79, used in the alignment system 75 (when present), may provide a green light or some form of feedback indicating that the material 55 is properly aligned on the nest 21. The substrate 24 is then loaded against the trim/material 55. The alignment of the stitching is optionally re-checked. The vision system 77 and/or camera system 79, used in the alignment system 75 (when present) may provide a green light or some form of feedback indicating that the material 55 remains properly aligned on the nest 21.

The platen 45, if utilized, is then lowered into position to apply the desired pressure to the substrate 24. The material folding assembly 25 is then activated, wherein the actuator 46 moves the sub-assembly (as provided in various forms in the embodiments described above) from the rest position to the actuated position. The platen 45, and the material folding system 25, could be activated simultaneously, or in any suitable sequence. The retainer section (such as the retainer section 44 or 234 in certain of the embodiments described) of the biasing slide is positioned in an operational or biasing position to hold the material 55 against the edge 24*a* of the substrate. Next, the material folding assembly and associated sub-assembly is moved to the actuated position, and a portion of the sub-assembly which holds, folds, pulls and otherwise tensions and secures the trim/material 55 to the substrate 24 (such as the material folder 31, 131*a*, 131*b*, 131*c* in the embodiments described in FIGS. 1-13; the one or more wheels 180 in FIGS. 14-15, or the l-shaped flange 236 in FIGS. 16-19). The platen 45 is then preferably raised/retracted. An optional stretching device can then be positioned and stretch the free end portion 56 of the material 55 prior to fastening. The fastening mechanism, such as the stapler 70, is moved into position, either manually or automated, to secure the free end portions 56 of the material 55 to the substrate 24 using a fastening device such as a staple 81. After the material 55 is secured to the inner portion 24*b* of the substrate 24, the material folder 31 is retracted to the rest position and the retainer section, in certain embodiments, is withdrawn to a non-operational or non-biasing position. The finished part 100, having the material 55 secured to the substrate 24, can now be removed from the nest 21.

The invention provided in the various embodiments herein provides an automated wrapping system to wrap, align, stretch and fasten material over substrates to form a wide variety of parts. The devices and methods provided herein are more accurate, simpler, more efficient, faster, more economic and financially advantageous as compared to traditional method and devices that typically utilize hand wrapping and fastening. Moreover, the elimination of hand wrapping and fastening enhances worker safety. Still further, the resultant parts, by virtue of their tighter wrapping, typically have an enhanced visual aesthetic appearance as compared with hand-wrapped parts with looser wrapping.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An automated wrapping system for trimming a substrate with a material, the substrate having an outer portion and an inner portion and an edge connecting the inner portion to the outer portion, said automated wrapping system comprising:
   a support;
   a nest mounted to said support and configured to position the material between the outer portion of the substrate and the nest, with the material including a free end portion not positioned between the nest and the outer portion of the substrate;
   a material folding assembly positioned adjacent to said nest, said material folding assembly movable between a rest position and an actuated position with a first portion of said material folding assembly holding the material against the edge of the substrate in said actuated position, wherein a second portion of said material folding assembly engages and folds the free end portion of the material over the edge of the substrate and onto a part of the inner portion of the substrate while said first portion continues to retain the material against the edge of the substrate; and
   an actuator connected to said material folding assembly for moving said material folding assembly between said rest position and said actuated position.

2. The automated wrapping system of claim 1 further comprising an assembly flange positioned adjacent to said support and said nest with said material folding assembly mounted to said assembly flange, and wherein said material folding assembly comprises:
   a slide mount mounted on said assembly flange,
   a biasing slide moveably mounted on said slide mount, said biasing slide including a retainer section for holding the material against the edge of the substrate when the material folding assembly is in the actuated position, and
   a material folder connected to said actuator and slidably coupled to said biasing slide, said actuator engaging said material folder to slide along said biasing slide between a first position and a second position, with said first position corresponding to said rest position and said second position corresponding to said actuated position, wherein said material folder engages and folds the free end portion of the material over the edge of the substrate and onto a part of the inner portion of the substrate when said material folder is moved to said second position.

3. The automated wrapping system of claim 2, wherein said material folding assembly further comprises:
an end block connected to said actuator and slidably mounted on said biasing slide, said actuator engaging said end block to slide said end block longitudinally along said biasing slide between a first slid position and second slid position, with said first slid position corresponding to said rest position and said second slid position corresponding to said actuated position;
a connector fixedly coupled to said material folder;
an actuation rod pivotally coupled to each of said end block and said connector;
wherein said end block engages said actuation rod to move said material folder to said first position when said end block moves to said first slid position, and
wherein said end block engages said actuation rod to move said material folder to said second position when said end block moves to said second slid position.

4. The automated wrapping system of claim 1, wherein said material folding assembly further comprises a slide spring coupled between said slide mount and said biasing slide, said slide spring configured for providing continuous biasing force on said retainer section of said biasing slide in a direction towards the material and the substrate when the material folding assembly is in said actuated position.

5. The automated wrapping system of claim 1, wherein said material folding system comprises:
a slide mount,
a biasing slide moveably mounted on said slide mount, said biasing slide including a retainer section for holding the material against the edge of the substrate when the material folding assembly is in the actuated position,
a material folder slidably coupled to said biasing slide, said material folder moveable relative to said biasing slide between a first position and a second position, with said first position corresponding to said rest position and said second position corresponding to said actuated position, wherein the material folder engages and folds the free end portion of the material over the edge of the substrate and onto a part of the inner portion of the substrate when said material folder is moved to said second position;
a ramp fixedly coupled to said material folder and disposed on said biasing slide, said ramp comprising:
a bottom surface positioned adjacent to said biasing slide,
an upper inclined surface extending transverse to and away from said biasing slide and said bottom surface, said bottom surface and said upper inclined surface connected at an inner edge,
a stop portion extending transverse from a terminal end of said upper inclined surface opposite said inner edge, said
a lower inclined surface connecting said stop portion to said bottom surface, said lower inclined surface extending in a direction transverse to bottom surface with a portion of said lower inclined surface disposed on said connector;
a cam spring coupled between said lower inclined surface and said biasing slide;
a cam end block coupled to said biasing slide such that said ramp is between said connector and said cam end block, said cam end block configured to be moveable in a longitudinal direction on said biasing slide between a first ramp position and a second ramp position;
a cam wheel pivotally coupled to said cam end block and disposed on said upper inclined surface;
wherein said actuator is connected to said cam end block and moves said cam end block in said longitudinal direction on said biasing slide between said first ramp position and said second ramp position, with said first ramp position corresponding to said rest position and said second ramp position corresponding to said actuated position,
wherein the movement of said cam end block from said second ramp position to said first ramp position engages said cam wheel to move along said upper inclined surface away from said stop portion, thereby moving said material folder to said first position, and
wherein the movement of said cam end block to said second position from said first position moves said cam wheel along said upper inclined surface towards said stop portion, thereby moving said material folder to said second position.

6. The automated wrapping system of claim 2, wherein said material folding assembly further comprises:
a fixed mount fixedly coupled to said biasing slide; and
a moveable mount mounted to said fixed mount and including a slide folder, said slide folder mounted to said material folder and configured for movement along said moveable mount as said material folder between said first position and said second position.

7. The automated wrapping assembly of claim 1, wherein said material folding assembly comprises:
an end block;
a base block coupled to said end block;
a slide block adjustably and fixedly coupled to said base block, said slide block including a retainer section engaging a free end portion of the material and holding the material against the edge of the substrate when the material folding assembly is in said actuated position;
an l-shaped flange pivotally coupled to said slide block and pivotally moveable relative to said slide block between a first pivoted position and a second pivoted position,
an l-shaped bracket seated on said slide block, and
a spring coupled between said l-shaped bracket and said l-shaped flange;
wherein said actuator is connected to said end block and moves said end block in a direction towards or away from said nest between a first block position and a second block position, with said first block position corresponding to said rest position and said second block position corresponding to said actuated position, and
wherein the l-shaped flange engages the free end portion of the material and pivots from said first pivoted position to said second pivoted position to fold the free end portion of the material over the edge of the substrate when said end block is moved to said second block position.

8. The automated wrapping system of claim 1, wherein said actuator comprises an air cylinder.

9. The automated wrapping system of claim 1, wherein said actuator comprises a hand actuating device.

10. The automated wrapping system of claim 1 further comprising a platen or pressure plate configured for applying pressure to the inner portion of the substrate opposite said nest.

11. The automated wrapping system of claim 1 further comprising an alignment system positioned adjacent to said nest and configured for aligning the material relative to the substrate.

12. The automated wrapping system of claim 11, wherein said alignment system includes a vision system.

13. The automated wrapping system of claim 11, wherein said alignment system includes a camera system.

14. The automated wrapping system of claim 1 further comprising a fastening mechanism configured for securing the material to the substrate when said material folding assembly is in said actuated position.

15. The automated wrapping system of claim 14, wherein said fastening mechanism comprises a stapler.

16. The automated wrapping system of claim 1, further comprising a stretching device configured for moving a free end portion of the material along the inner portion of the substrate in a direction away from the edge of the substrate when said material folding assembly is in said actuated position.

17. A method for wrapping a substrate with a material to form a part, said method comprising:
   providing an automated wrapping system comprising a support, a nest mounted to the support, a material folding assembly positioned adjacent to the nest and moveable between a rest position and an actuated position, and an actuator connected to the material folding assembly,
   positioning a material onto the nest,
   providing a substrate having an outer portion, an inner portion, and an edge between the outer portion and the inner portion;
   positioning the outer portion of the substrate onto the material opposite the nest such that a free end portion of the material extends beyond the nest and the edge of the substrate; and
   activating the actuator to move the material folding assembly from the rest position to the actuated position to allow a second portion of the material folding assembly to fold the free end portion of the material over the edge of the substrate and adjacent the inner portion of the substrate while a first portion of the material folding assembly retains the material against the edge of the substrate.

18. The method of claim 17, wherein the material folding assembly comprises a biasing slide, and wherein the biasing slide holds the material against the edge of the substrate prior to the material folding assembly moving to the actuated position.

* * * * *